US009149761B2

(12) United States Patent
Northrop et al.

(10) Patent No.: US 9,149,761 B2
(45) Date of Patent: Oct. 6, 2015

(54) REMOVAL OF ACID GASES FROM A GAS STREAM, WITH $CO_2$ CAPTURE AND SEQUESTRATION

(75) Inventors: Paul S Northrop, Spring, TX (US); Robbin Bruce Anderson, Boerne, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 383 days.

(21) Appl. No.: 13/516,991

(22) PCT Filed: Nov. 30, 2010

(86) PCT No.: PCT/US2010/058395
§ 371 (c)(1),
(2), (4) Date: Jun. 18, 2012

(87) PCT Pub. No.: WO2011/090553
PCT Pub. Date: Jul. 28, 2011

(65) Prior Publication Data
US 2012/0279728 A1    Nov. 8, 2012

Related U.S. Application Data

(60) Provisional application No. 61/297,529, filed on Jan. 22, 2010.

(51) Int. Cl.
*B01D 53/73* (2006.01)
*B01D 53/14* (2006.01)
(Continued)

(52) U.S. Cl.
CPC .......... *B01D 53/1462* (2013.01); *B01D 53/526* (2013.01); *C01B 17/0404* (2013.01); *B01D 2252/20489* (2013.01); *B01D 2252/602* (2013.01); *Y02C 10/06* (2013.01)

(58) Field of Classification Search
CPC .................. G06F 2009/45587; G06F 21/121; G06F 9/45558; G06F 21/12
USPC ................................... 166/401, 402
See application file for complete search history.

(56) References Cited

U.S. PATENT DOCUMENTS 2,621,216 A   12/1952  White ........................ 260/683.3
2,863,527 A   12/1958  Herbert et al. ................ 183/115
(Continued)

FOREIGN PATENT DOCUMENTS

EP      0508244      10/1992   ............. B01D 53/34
EP      1323698      7/2003    ............. C07C 29/38
(Continued)

OTHER PUBLICATIONS

Aaron, D. et al. (2005) "Separation of $CO_2$ from Flue Gas: A Review," *Separation Science and Technology*, 40, pp. 321-348.
(Continued)

*Primary Examiner* — Zakiya W Bates
*Assistant Examiner* — Silvana Runyan
(74) *Attorney, Agent, or Firm* — ExxonMobil Upstream Research Company Law Department

(57) ABSTRACT

A gas processing facility and method for processing a hydrocarbon gas stream comprising sulfurous components and carbon dioxide. The gas processing facility includes an acid gas removal facility for separating the hydrocarbon gas stream into (i) a sweetened gas stream, and (ii) an acid gas stream comprised primarily of hydrogen sulfide and carbon dioxide. The gas processing facility also includes a Claus sulfur recovery unit that generates a tail gas, and a tail gas treating unit for receiving the tail gas. In various embodiments, the gas processing facility and method capture $CO_2$ from the tail gas and injects it under pressure into a subsurface reservoir.

26 Claims, 8 Drawing Sheets

(51) Int. Cl.
*B01D 53/52* (2006.01)
*C01B 17/04* (2006.01)

(56) References Cited

U.S. PATENT DOCUMENTS

| | | | |
|---|---|---|---|
| 3,050,950 A | 8/1962 | Karwat et al. | 62/13 |
| 3,109,726 A | 11/1963 | Karwat | 62/13 |
| 3,393,527 A | 7/1968 | Swensen et al. | 62/16 |
| 3,400,512 A | 9/1968 | McKay | 55/69 |
| 3,767,766 A | 10/1973 | Tjoa et al. | 423/220 |
| 3,895,101 A | 7/1975 | Tsuruta | 423/574 |
| 3,933,001 A | 1/1976 | Muska | 62/47 |
| 4,246,015 A | 1/1981 | Styring | 62/12 |
| 4,270,937 A | 6/1981 | Adler | 62/17 |
| 4,318,723 A | 3/1982 | Holmes et al. | 62/20 |
| 4,319,964 A | 3/1982 | Katz et al. | 202/172 |
| 4,336,233 A | 6/1982 | Appl et al. | 423/228 |
| 4,382,912 A | 5/1983 | Madgavkar et al. | 423/224 |
| 4,383,841 A | 5/1983 | Ryan et al. | 62/17 |
| 4,405,585 A | 9/1983 | Sartori et al. | 423/228 |
| 4,417,449 A | 11/1983 | Hegarty et al. | 62/28 |
| 4,417,909 A | 11/1983 | Weltmer | 62/12 |
| 4,421,535 A | 12/1983 | Mehra | 62/17 |
| 4,441,900 A | 4/1984 | Swallow | 62/29 |
| 4,459,142 A | 7/1984 | Goddin | 62/17 |
| 4,462,814 A | 7/1984 | Holmes et al. | 62/17 |
| 4,511,382 A | 4/1985 | Valencia et al. | 62/20 |
| 4,512,782 A | 4/1985 | Bauer et al. | 55/48 |
| 4,533,372 A | 8/1985 | Valencia et al. | 62/12 |
| 4,551,158 A | 11/1985 | Wagner et al. | 55/46 |
| 4,563,202 A | 1/1986 | Yao et al. | 62/17 |
| 4,602,477 A | 7/1986 | Lucadamo | 62/24 |
| 4,609,388 A | 9/1986 | Adler et al. | 62/12 |
| 4,636,334 A | 1/1987 | Skinner et al. | 252/377 |
| 4,678,039 A * | 7/1987 | Rivas et al. | 166/303 |
| 4,695,672 A | 9/1987 | Bunting | 585/867 |
| 4,717,408 A | 1/1988 | Hopewell | 62/20 |
| 4,720,294 A | 1/1988 | Lucadamo et al. | 62/31 |
| 4,761,167 A | 8/1988 | Nicholas et al. | 62/17 |
| 4,762,543 A | 8/1988 | Pantermuehl et al. | 62/28 |
| 4,822,393 A | 4/1989 | Markbreiter et al. | 62/17 |
| 4,831,206 A | 5/1989 | Zarchy | 585/737 |
| 4,923,493 A | 5/1990 | Valencia et al. | 62/13 |
| 4,935,043 A | 6/1990 | Blanc et al. | 62/20 |
| 4,976,849 A | 12/1990 | Soldati | 208/351 |
| 5,011,521 A | 4/1991 | Gottier | 62/11 |
| 5,062,270 A | 11/1991 | Haut et al. | 62/12 |
| 5,120,338 A | 6/1992 | Potts et al. | 62/12 |
| 5,233,837 A | 8/1993 | Callahan | 62/38 |
| 5,265,428 A | 11/1993 | Valencia et al. | 62/36 |
| 5,335,504 A | 8/1994 | Durr et al. | 62/20 |
| 5,620,144 A | 4/1997 | Strock et al. | 239/557 |
| 5,700,311 A | 12/1997 | Spencer | 95/236 |
| 5,720,929 A | 2/1998 | Minkkinen et al. | 422/190 |
| 5,819,555 A | 10/1998 | Engdahl | 62/637 |
| 5,820,837 A | 10/1998 | Marjanovich et al. | 423/220 |
| 5,956,971 A | 9/1999 | Cole et al. | 62/623 |
| 5,964,985 A | 10/1999 | Wootten | 201/40 |
| 5,983,663 A | 11/1999 | Sterner | 62/620 |
| 6,053,007 A | 4/2000 | Victory et al. | 62/619 |
| 6,082,133 A | 7/2000 | Barclay et al. | 62/619 |
| 6,082,373 A | 7/2000 | Sakurai et al. | 134/1 |
| 6,162,262 A | 12/2000 | Minkkinen et al. | 23/295 |
| 6,223,557 B1 | 5/2001 | Cole | 62/613 |
| 6,240,744 B1 | 6/2001 | Agrawal et al. | 62/643 |
| 6,336,334 B1 | 1/2002 | Minkkinen et al. | 62/123 |
| 6,374,634 B2 | 4/2002 | Gallarda et al. | 62/620 |
| 6,401,486 B1 | 6/2002 | Lee et al. | 62/630 |
| 6,416,729 B1 | 7/2002 | DeBerry et al. | 423/573.1 |
| 6,442,969 B1 | 9/2002 | Rojey et al. | 62/618 |
| 6,505,683 B2 | 1/2003 | Minkkinen et al. | 166/266 |
| 6,516,631 B1 | 2/2003 | Trebble | 62/630 |
| 6,517,801 B2 | 2/2003 | Watson et al. | 423/574.1 |
| 6,539,747 B2 | 4/2003 | Minta et al. | 62/620 |
| 6,565,629 B1 | 5/2003 | Hayashida et al. | 95/211 |
| 6,605,138 B2 | 8/2003 | Frondorf | 95/160 |
| 6,631,626 B1 | 10/2003 | Hahn | 62/612 |
| 6,632,266 B2 | 10/2003 | Thomas et al. | 95/49 |
| 6,711,914 B2 | 3/2004 | Lecomte | 62/625 |
| 6,735,979 B2 | 5/2004 | Lecomte et al. | 62/611 |
| 6,755,251 B2 | 6/2004 | Thomas et al. | 166/265 |
| 6,818,194 B2 | 11/2004 | DeBerry et al. | 423/228 |
| 6,946,017 B2 | 9/2005 | Leppin et al. | 95/139 |
| 6,958,111 B2 | 10/2005 | Rust et al. | 202/158 |
| 6,962,061 B2 | 11/2005 | Wilding et al. | 62/613 |
| 6,962,680 B1 | 11/2005 | Ishigaki et al. | 423/224.09 |
| 7,001,490 B2 | 2/2006 | Wostbrock et al. | 203/1 |
| 7,004,985 B2 | 2/2006 | Wallace et al. | 48/198.3 |
| 7,066,986 B2 | 6/2006 | Haben et al. | 95/99 |
| 7,073,348 B2 | 7/2006 | Clodic et al. | 62/532 |
| 7,121,115 B2 | 10/2006 | Lemaire et al. | 62/625 |
| 7,128,150 B2 * | 10/2006 | Thomas et al. | 166/266 |
| 7,128,276 B2 | 10/2006 | Nilsen et al. | 236/124 |
| 7,152,431 B2 | 12/2006 | Amin et al. | 62/637 |
| 7,211,701 B2 | 5/2007 | Muller et al. | 568/853 |
| 7,219,512 B1 | 5/2007 | Wilding et al. | 62/617 |
| 7,325,415 B2 | 2/2008 | Amin et al. | 62/541 |
| 7,424,808 B2 | 9/2008 | Mak | 62/625 |
| 7,437,889 B2 | 10/2008 | Roberts et al. | 62/619 |
| 7,442,231 B2 | 10/2008 | Landrum | 95/45 |
| 7,442,233 B2 | 10/2008 | Mitariten | 95/123 |
| 7,493,779 B2 | 2/2009 | Amin | 62/617 |
| 7,550,064 B2 | 6/2009 | Bassler et al. | 203/29 |
| 7,575,624 B2 | 8/2009 | Cartwright et al. | 95/51 |
| 7,637,987 B2 | 12/2009 | Mak | 95/160 |
| 7,662,215 B2 | 2/2010 | Sparling et al. | 95/172 |
| 7,691,239 B2 | 4/2010 | Kister et al. | 203/2 |
| 7,707,013 B2 * | 4/2010 | Valdez et al. | 703/2 |
| 7,722,289 B2 | 5/2010 | Leone et al. | 405/53 |
| 7,879,135 B2 | 2/2011 | Ravikumar et al. | 95/11 |
| 8,002,498 B2 | 8/2011 | Leone et al. | 405/53 |
| 8,020,408 B2 | 9/2011 | Howard et al. | 62/646 |
| 8,303,685 B2 | 11/2012 | Schubert et al. | 95/181 |
| 8,308,849 B2 | 11/2012 | Gal | 95/187 |
| 8,765,086 B2 | 7/2014 | Brok et al. | 423/220 |
| 2002/0174687 A1 | 11/2002 | Cai | 65/158 |
| 2003/0181772 A1 | 9/2003 | Meyer et al. | 585/324 |
| 2003/0192343 A1 | 10/2003 | Wilding et al. | 62/613 |
| 2004/0221578 A1 | 11/2004 | Iijima et al. | 60/649 |
| 2006/0144079 A1 | 7/2006 | Amin | 62/532 |
| 2006/0179878 A1 | 8/2006 | Nohlen | 62/617 |
| 2006/0239879 A1 | 10/2006 | Lallemand et al. | 423/210 |
| 2007/0056317 A1 | 3/2007 | Amin et al. | 62/532 |
| 2007/0144943 A1 | 6/2007 | Lemaire et al. | 208/208 |
| 2007/0277674 A1 | 12/2007 | Hirano et al. | 95/290 |
| 2008/0034789 A1 | 2/2008 | Fieler et al. | 62/623 |
| 2008/0209807 A1 | 9/2008 | Tsangaris et al. | 48/89 |
| 2008/0282884 A1 | 11/2008 | Kelley et al. | 95/96 |
| 2008/0307827 A1 | 12/2008 | Hino et al. | 62/634 |
| 2009/0023605 A1 | 1/2009 | Lebl et al. | 506/27 |
| 2009/0071648 A1 | 3/2009 | Hagen et al. | 166/272.1 |
| 2009/0220406 A1 | 9/2009 | Rahman | 423/437.1 |
| 2009/0261017 A1 | 10/2009 | Iqbal et al. | 208/128 |
| 2010/0018248 A1 | 1/2010 | Fieler et al. | 62/617 |
| 2010/0024472 A1 | 2/2010 | Amin et al. | 62/541 |
| 2010/0107687 A1 | 5/2010 | Andrian et al. | 62/620 |
| 2010/0132405 A1 | 6/2010 | Nilsen | 62/611 |

FOREIGN PATENT DOCUMENTS

| | | | |
|---|---|---|---|
| GB | 2221977 | 2/1990 | F25J 3/02 |
| WO | WO01/85656 | 11/2001 | C07C 11/167 |
| WO | WO02/32536 | 4/2002 | B01F 13/00 |
| WO | WO02/39038 | 5/2002 | F25J 3/06 |
| WO | WO03/062725 | 7/2003 | F25J 3/08 |
| WO | WO2004/009204 | 1/2004 | B01D 3/32 |
| WO | WO2004/020118 | 3/2004 | B08B 9/00 |
| WO | WO2004/047956 | 6/2004 | B01D 53/14 |
| WO | WO2004/070297 | 8/2004 | F25J 3/06 |
| WO | WO2006/022885 | 3/2006 | B01D 53/14 |
| WO | WO2007/030888 | 3/2007 | F25J 3/08 |
| WO | WO2008/002592 | 1/2008 | F25J 3/08 |
| WO | WO2008/034789 | 3/2008 | G10K 11/00 |
| WO | WO2008/091316 | 7/2008 | F25J 3/00 |

(56) References Cited

FOREIGN PATENT DOCUMENTS

| WO | WO2008/091317 | 7/2008 | ............. F25D 25/00 |
| WO | WO2008/095258 | 8/2008 | ................ F25J 3/02 |
| WO | WO2008/107581 | 9/2008 | ............. F02D 41/02 |
| WO | WO2008/152030 | 12/2008 | ............. B01D 53/00 |
| WO | WO2009/029353 | 3/2009 | ............. E21B 43/00 |
| WO | WO2009/087206 | 7/2009 | ............. B01D 53/00 |
| WO | WO2010/003894 | 1/2010 | ................ F25J 3/06 |
| WO | WO2010/006934 | 1/2010 | ................ F25J 3/02 |
| WO | WO2010/023238 | 3/2010 | ................ F25J 3/06 |
| WO | WO2010/034627 | 4/2010 | ................ F25J 3/06 |
| WO | WO2010/044956 | 4/2010 | ............. B01D 53/14 |
| WO | WO2010/052299 | 5/2010 | ............. B01D 53/00 |
| WO | WO2010/079175 | 7/2010 | ................ F25J 3/06 |
| WO | WO2010/079177 | 7/2010 | ................ F25J 3/06 |
| WO | WO2011/026170 | 3/2011 | ................ C10L 3/10 |
| WO | WO2011/140117 | 11/2011 | ............. B01D 53/00 |

OTHER PUBLICATIONS

Amin, R. (2003) "Advanced Mini Natural Gas Liquefier," *LNG Journal*, Mar.-Apr. 2003, pp. 20-23.

Denton, R. D. et al. (1985) "Integrated Low Temperature Processing of Sour Natural Gas," *Gas Processors Assoc., 64th Ann. Conv.*, pp. 92-96.

Hassan, S. M. N. (2005) "Techno-Economic Study of $CO_2$ Capture Process for Cement Plants," *University of Waterloo—Thesis*, 200 pages.

Haut, R. C. et al. (1988) "Development and Application of the Controlled Freeze Zone Process," *SPE 17757, SPE Gas Tech. Symp.—Dallas, TX*, pp. 435-443.

Haut, R. C. et al. (1988) "Development and Application of the Controlled Freeze Zone Process," *OSEA 88197, 7th Offshore So. East Asia Conf., Singapore*, Feb. 1988, pp. 840-848.

Haut, R. C. et al. (1989) "Development and Application of the Controlled Freeze Zone Process," *SPE Production Engineering*, Aug. 1989, pp. 265-271.

Mitariten, M. et al. (2007) "The Sorbead™ Quick-Cycle Process for Simultaneous Removal of Water, Heavy Hydrocarbons and Mercaptans from Natural Gas," *Laurance Reid Gas Conditioning Conference*, Feb. 25-27, 2007, 14 pages.

Northrop, P. Scott et al. (2004) "Cryogenic Sour Gas Process Attractive for Acid Gas Injection Applications," *83rd Ann. Gas Processors Assoc. Convention, New Orleans, LA*, 8 pgs.

Pagcatipunan, C. et al. (2005) "Maximize the Performance of Spray Nozzle Systems," *CEP Magazine*, Dec. 2005, pp. 38-44.

Reyes, S. C. et al. (1997) "Frequency Modulation Methods for Diffusion and Adsorption Measurements in Porous Solids," *J. Phys. Chem. B*, v.101, pp. 614-622.

Thomas, E. R. et al. (1987) "Conceptual Studies Using the Controlled Freeze Zone (CFZ) Process," *AIChE Summer Nat'l Mtg.*, Aug. 16-19, 1987, 16 pages.

Thomas, E. R. et al. (1988) "Conceptual Studies for $CO_2$/Natural Gas Separation Using the Control Freeze Zone (CFZ) Process," *Gas Separation and Purification*, v. 2, pp. 84-89.

Victory, D. J. et al. (1987) "The CFZ Process: Direct Methane-Carbon Dioxide Fractionation," *66th Ann. GPA Convention*, Mar. 16-18, Denver, CO, 4 pages.

\* cited by examiner

REMOVAL OF ACID GASES FROM A GAS STREAM, WITH CO$_2$ CAPTURE AND SEQUESTRATION

CROSS-REFERENCE TO RELATED APPLICATION

This application is the National Stage of International Application No. PCT/US2010/058395, filed Nov. 30, 2010, which claims the benefit of U.S. Provisional Application No. 61/297,529, filed Jan. 22, 2010, the entirety of which is incorporated by reference herein.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present invention relates to the field of fluid separation. More specifically, the present invention relates to the removal of sulfurous components from a hydrocarbon fluid stream, and to the recovery of carbon dioxide associated with the hydrocarbon fluid stream.

DISCUSSION OF TECHNOLOGY

The production of raw natural gas from a reservoir oftentimes carries with it the incidental production of non-hydrocarbon gases. Such gases may include trace amounts of helium or nitrogen. Such gases may also include contaminants such as carbon dioxide ($CO_2$), or various sulfur-containing compounds. Sulfur containing compounds may include hydrogen sulfide ($H_2S$), carbonyl sulfide (COS), carbon disulfide ($CS_2$), mercaptans, organic sulfides, and thiophenes.

When $H_2S$ and $CO_2$ are produced as part of a hydrocarbon gas stream (such as methane or ethane), the gas stream is sometimes referred to as "sour gas." Sour gas is usually treated to remove $CO_2$, $H_2S$, and other contaminants before it is sent downstream for further processing or sale. Removal of acid gases creates a "sweetened" hydrocarbon gas stream. The sweetened gas stream may then be used as an environmentally-acceptable fuel, or it may be chilled into liquefied natural gas, or LNG, for transportation and later industrial or residential use.

Several processes have been devised to remove contaminants from a hydrocarbon gas stream. One commonly-used approach for treating raw natural gas involves the use of physical solvents. An example of a physical solvent is Selexol®. Selexol® is a trade name for a gas treating product of Union Carbide, which is a subsidiary of Dow Chemical Company. Selexol™ solvent is a mixture of dimethyl ethers of polyethylene glycols. An example of one such component is dimethoxy tetraethylene glycol. If Selexol™ solvent is chilled and then pre-saturated with $CO_2$, the Selexol™ solvent will be selective towards $H_2S$.

Another approach for treating raw natural gas involves the use of chemical solvents. An example of a chemical solvent is an $H_2S$-selective amine. $H_2S$-selective amines include methyl diethanol amine (MDEA), and the Flexsorb® family of amines. Flexsorb® amines are preferred chemical solvents for selectively removing $H_2S$ from $CO_2$-containing gas streams. Flexsorb® amines take advantage of the relatively fast rate of $H_2S$ absorption compared to $CO_2$ absorption. The sterically-hindered amine molecule helps to prevent the formation of carbamates.

Amine-based solvents rely on a chemical reaction with acid gas components in the hydrocarbon gas stream. The reaction process is sometimes referred to as "gas sweetening." Such chemical reactions are generally more effective than physical-based solvents, particularly at feed gas pressures below about 300 psia (2.07 MPa). In this respect, amine-based $H_2S$ removal may be done at low pressure.

Hybrid solvents have also been used for the removal of acidic components. Hybrid solvents employ a mixture of physical and chemical solvents. An example of a hybrid solvent is Sulfinol®.

The use of the above solvents involves optionally chilling the raw natural gas, and then mixing it with a "lean" solvent in a contactor vessel. When the solvent includes a chemical solvent, the contactor vessel may be referred to as an absorber vessel or a contacting tower. In this instance, the chemical solvent absorbs the acidic components. For example, the removal of hydrogen sulfide using a selective amine may be accomplished by contacting the optionally dehydrated and optionally chilled raw natural gas stream with the chemical solvent in an absorber vessel.

Traditionally, the removal of acid gases using chemical solvents involves counter-currently contacting the raw natural gas stream with the solvent. The raw gas stream is introduced into the bottom section of a contacting tower. At the same time, the solvent solution is directed into a top section of the tower. The tower has trays, packings or other "internals." As the liquid solvent cascades through the internals, it absorbs the undesirable acid gas components, carrying them away through the bottom of the contacting tower as part of a "rich" solvent solution. At the same time, gaseous fluid that is largely depleted of $H_2S$ and/or $CO_2$ exits at the top of the tower.

In the above process, the sweetened gas stream contains primarily methane with a smaller amount of carbon dioxide. This "sweet" gas flows out of the top of the contactor or absorber. The treated "sweet" gas can be further processed, such as for liquids recovery, or sold into a pipeline if the $CO_2$ concentration is less than, for example, about 2% by volume. In addition, the sweetened gas stream may be used as feedstock for a gas-to-liquids process, and then ultimately used to make waxes, butanes, lubricants, glycols and other petroleum-based products.

As noted, the solvent process also produces a "rich" solvent stream, containing the solvent and acidic components. The rich solvent can be regenerated by stripping the acidic components to make it lean again, so that the solvent may be recycled. The process of regeneration is also sometimes called "desorption," and is employed to separate acid gases from the active solvent of the absorbent liquid. What is left is a concentrated acidic impurities stream comprising sulfur-containing compounds and some carbon dioxide.

The use of solvents for a gas separation processes create an issue as to the disposal of the separated sulfurous contaminants. If appreciable levels of sulfur compounds are present in the acid gas, it must be reacted in some way to make a non-hazardous by-product such as elemental sulfur, or sequestered in some manner. In some cases, the concentrated acid gas (consisting primarily of $H_2S$ with some $CO_2$) is sent to a sulfur recovery unit ("SRU"). The SRU converts the $H_2S$ into benign elemental sulfur. There are many existing plants where the H₂S is converted to sulfur and stored.

While the sulfur is stored on land, the carbon dioxide gas is oftentimes vented from the absorber vessel to the atmosphere. However, the practice of venting CO₂ is sometimes undesirable. One proposal to minimizing CO₂ emissions is a process called acid gas injection ("AGI"). AGI means that unwanted sour gases are re-injected into a subterranean formation under pressure immediately following acid gas removal.

Acid gas injection is a relatively new technology that is practiced on a large scale in only a limited number of fields. AGI requires the availability of a suitable underground reservoir coupled with significant compression. CO₂ and H₂S may optionally be injected and sequestered together.

In some instances, injected acid gas is used to create artificial reservoir pressure for enhanced oil recovery operations. This means that the acidic components are used as a miscible enhanced oil recovery (EOR) agent to recover additional oil. This is particularly attractive when the acid gas is primarily made up of carbon dioxide. If the volume and/or concentration of H₂S is too high for a candidate injection reservoir, then the bulk of the H₂S will again need to be converted into elemental sulfur before AGI.

In any instance, a known type of sulfur recovery process that converts H₂S to elemental sulfur is the Claus process. In a Claus process, one-third of the hydrogen sulfide (and other sulfurous components) is burned with air in a reactor furnace to form SO₂ (and some elemental sulfur). This is an oxidation process performed according to the following reaction:

$$H_2S + 3/2 O_2 \rightarrow SO_2 + H_2O$$

or $$2H_2S + 3O_2 \rightarrow 2SO_2 + 2H_2O$$

This is a strongly exothermic reaction that generates sulfur dioxide. A substantial amount of nitrogen may enter the process at this point, but does not participate in the chemical reaction. A subsequent reaction takes place from the heating and oxidation, known as a Claus reaction:

$$2H_2S + SO_2 \leftrightarrow 3S + 2H_2O$$

As can be seen, sulfur and water are formed in this reaction. The sulfur and water are delivered to a condenser. Elemental sulfur is released from the condenser as a molten liquid. The molten sulfurous liquid may then be frozen into any number of forms.

The Claus reaction is equilibrium-limited, which is to say that the reaction does not generally go to completion, though high conversions, i.e., greater than 95%, are possible. The higher the initial H₂S concentration in the acid gas stream, the more efficient the Claus sulfur removal process is. In any instance, some amount of unreacted H₂S and SO₂ remain. These gases are reheated and passed into a catalytic reactor containing alumina or titania catalyst. The catalyst facilitates further reaction between the H₂S and SO₂ to form more elemental sulfur. This sequence of condensing sulfur, reheating gas, and passing it to a catalytic reactor may be repeated one or two more times to reach a desired level of sulfur recovery.

The general process for a Claus sulfur recovery operation is shown schematically in FIG. 1. FIG. 1 shows a known sulfur recovery plant 100. The sulfur recovery plant 100 operates to convert hydrogen sulfide and other sulfurous components into elemental sulfur. Elemental sulfur is shown being incrementally deposited from the plant 100 at lines 150', 150", 150'''.

To conduct the Claus process, an acid gas stream containing H₂S is directed into the plant 100. The acid gas stream is shown at line 110. The acid gas stream 110 is introduced into a reactor furnace 120, along with a stream of air 115. There, one-third of the hydrogen sulfide (and other sulfurous components) is burned with the air 115 to form SO₂ (and some elemental sulfur) according to the first reaction set forth above. The reactor furnace 120 operates at pressures around 10 to 15 psig and typically at temperatures above 850° C.

The reactor furnace 120 works with a waste heat boiler 125 as part of the "thermal section" of the Claus process. The waste heat boiler 125 recovers heat from the reactor 120 so as to generate steam. Sulfur and water vapor are generated according to the second reaction above.

In FIG. 1, a combination of sulfur and water is shown leaving the waste heat boiler 125 at line 122. The sulfur and water in line 122 are then directed into a first condenser 130'. In the condenser 130', elemental sulfur is condensed out of the gas phase. Sulfur is released from the first condenser 130' in a first sulfur line 150'. The sulfur in sulfur line 150' is initially in a molten liquid phase, but converts to a solid phase during cooling in a downstream process.

In experience, the Claus reaction does not convert all H₂S and SO₂ into elemental sulfur. This means that unreacted H₂S and SO₂ remain. To obtain further conversion, the unreacted H₂S and SO₂ (along with CO₂, N₂, and H₂O vapor) are released from the first condenser 130' through an overhead line 132'. The released gases in overhead line 132' are heated in reheater 140' above the sulfur dew point. A heated stream of H₂S, SO₂, and other gases is released from the reheater 140' through line 142'. The heated stream of H₂S and other gases in line 142' is introduced into a converter, or "reactor" 144' containing alumina or titania catalyst. The catalyst facilitates further reaction between the H₂S and SO₂ to form more elemental sulfur.

The elemental sulfur passes through line 146' into a second condenser 130". Elemental sulfur is condensed out of the gas phase of line 146' and is released through second sulfur line 150" as a molten liquid. This sequence of condensing sulfur, reheating gas, and passing it to a catalytic reactor may optionally be repeated one or two more times to reach a desired level of sulfur recovery. In FIG. 1, a second reheater is seen at 140", a second stream of heated H₂S and SO₂ is seen at 142", a second reactor is seen at 144", and a third condenser is seen at 130'''. The third condenser 130''' condenses out a third sulfur line 150'''.

Even after passing through the catalytic stages, there may be too much unreacted H₂S and SO₂. Typically, 1 to 3 percent by volume of these gases will remain. This percentage is typically considered too high to incinerate and release into the atmosphere. This remaining sulfurous gas stream is referred to as "tail gas." The tail gas will contain not only unreacted H₂S and SO₂, but may also contain CO₂ and N₂ from the combustion air. The tail gas is shown at line 160 coming out of the third condenser 130'''. Of course, the tail gas 160 may be line 132" if the second reheater 140", second reactor 144", and third condenser 130" are not used.

Some governmental entities require a greater than 97% or 98% sulfur recovery efficiency. In order to achieve this level of sulfur removal, the tail gas 160 must be treated. This is done in a tail gas treating unit, or "TGTU." A number of "tail gas" treatment options have been devised for a TGTU.

FIG. 2 shows a known gas treating and sulfur recovery facility 200, in a schematic arrangement. The facility 200 includes an acid gas removal facility 220 followed by a Claus sulfur recovery unit 230. The facility 200 also includes a tail gas treating unit 240.

In FIG. 2, a raw gas stream 210 is first shown entering an acid gas removal facility 220. The gas stream 210 may be, for example, raw natural gas from a hydrocarbon recovery operation. For natural gas treating applications, it is preferred that the gas stream 210 have a pressure of at least 100 psig, and more typically at least 500 psig. While it is generally contemplated that at least a portion of the gas pressure is due to the pressure of the gas stream 210 entering the gas treatment facility 200 from a subsurface reservoir, it should also be recognized that the pressure may be boosted using one or more compressors (not shown).

It is also understood that the raw natural gas stream 210 has typically undergone dehydration before entering the acid gas removal facility 220. This may be done through the use of glycol. It is also desirable to keep the gas stream 210 clean so as to prevent foaming of liquid solvent during the acid gas treatment process in the acid gas removal system 220. Therefore, the raw natural gas stream 210 is typically passed through an inlet separator and coalescer (not shown) to filter out impurities such as brine and drilling fluids. The separator and coalescer will also remove any condensed hydrocarbons. Some particle filtration may also take place.

The gas stream 210 contains at least one hydrocarbon gas component, principally methane. In addition, the gas stream 210 contains at least one acid gas. Examples of an acid gas are hydrogen sulfide and carbon dioxide. A natural gas stream in a particularly "sour" field may have, for example, 10 to 40% $H_2S$ and/or 5 to 10% $CO_2$ along with methane and possibly heavier hydrocarbon components such as ethane or propane.

The acid gas removal facility 220 operates to separate out the acid gas components from the hydrocarbon gases. This may done, for example, through the various solvent reaction processes discussed above. Alternatively, a cryogenic separation process may be employed, such as the use of the Controlled Freeze Zone™ (CFZ) process created and used by ExxonMobil Upstream Research Company. The CFZ™ process takes advantage of the propensity of carbon dioxide to form solid particles by allowing frozen $CO_2$ and $H_2S$ particles to form within an open portion of a distillation tower, and then capturing the particles on a melt tray. As a result, a clean methane stream (along with any nitrogen or helium present in the raw gas) is generated at the top of the tower, while a cold liquid $CO_2/H_2S$ stream is generated at the bottom of the tower. Certain aspects of the CFZ™ process and associated equipment are described in U.S. Pat. Nos. 4,533,372; 4,923, 493; 5,062,270; 5,120,338; and 6,053,007.

In FIG. 2, a sweetened gas stream is seen exiting the acid gas removal facility 220 overhead. This is shown at line 222. In addition, an acid gas stream is seen exiting the acid gas removal facility 220 as a bottoms stream. This is shown at line 224. The acid gas stream in line 224 contains primarily carbon dioxide and hydrogen sulfide. The acid gas stream enters a Claus sulfur recovery facility 230. The Claus sulfur recovery facility 230 serves as a SRU.

As discussed above in connection with FIG. 1, the Claus sulfur recovery facility 230 operates to break sulfurous components in the acid gas stream down into elemental sulfur. In FIG. 2, an elemental sulfur stream is shown exiting the Claus SRU 230 at 232. A tail gas stream also exits the Claus SRU 230, through line 234.

The tail gas stream 234 is directed to a TGTU. The TGTU is shown at 240. In the TGTU, the tail gas stream 234 is "cleaned." In the arrangement of FIG. 2, hydrogen sulfide is directed from the TGTU 240 and recycled back to the front end of the Claus sulfur recovery unit 230. This is seen at line 242. The remaining products, consisting primarily of nitrogen and carbon dioxide are directed to an incinerator 250 through line 244. The traces of $H_2S$ are burned and vented to the atmosphere along with nitrogen and carbon dioxide through vent line 252.

As noted, different tail gas treatment options have been devised for a TGTU. For example, Shell employs a Shell Claus Offgas Treating (SCOT) process. There, the tail gas is hydrogenated to convert the $SO_2$ and mercaptans in the tail gas stream to $H_2S$. This is done through the use of a reducing gas generator (RGG) and subsequent cobalt-molybdenum (Co—Mo) catalytic bed. This process is shown and described in further detail below in connection with FIG. 3A.

The output of the SCOT process is $H_2S$ with some amount of $CO_2$, which is recycled back to the Claus sulfur recovery unit 230. However, in the SCOT process, most $CO_2$ necessarily travels through the TGTU 240 and passes to the incinerator 250 and is vented to the atmosphere along with $N_2$. A vent line is again shown at 252.

It is desirable to provide an improved tail gas treating unit that reduces or minimizes the amount of $CO_2$ vented to the atmosphere. It is further desirable to substantially reduce $CO_2$ emissions from a tail gas treating unit by capturing increased levels of $CO_2$ from a tail gas treating unit, and injecting it into a reservoir, optionally for enhanced oil recovery operations.

SUMMARY OF THE INVENTION

A gas processing facility for processing a hydrocarbon gas stream is first provided. The hydrocarbon gas stream comprises sulfurous components and carbon dioxide. In various embodiments, the gas processing facility captures $CO_2$ and pressurizes it for injection into a subsurface reservoir.

The gas processing facility includes an acid gas removal facility. The acid gas removal facility separates the hydrocarbon gas stream into (i) a sweetened gas stream, and (ii) a first acid gas stream comprised primarily of hydrogen sulfide and carbon dioxide.

The gas processing facility also includes a Claus sulfur recovery unit. The Claus sulfur recovery unit receives the acid gas stream, and separates the first acid gas stream into (i) a liquid stream of elemental sulfur, and (ii) a tail gas comprising acid gas impurities.

The gas processing facility further includes a tail gas treating unit. The tail gas treating unit receives the tail gas, and separates the tail gas into (i) an overhead by-products stream from an absorber vessel, and (ii) a second acid gas stream from a regenerator vessel. Preferably, the absorber vessel utilizes an amine that absorbs both carbon dioxide and sulfurous components. In this way, a majority of the hydrogen sulfide and the carbon dioxide entering the tail gas treating unit is absorbed in the absorber vessel and released from the absorber vessel to the regenerator vessel as a rich solvent stream.

In one aspect, the amine comprises diethanol amine (DEA), di-isopropanol amine (DIPA), monoethanol (MEA), or combinations thereof. In another aspect, the amine comprises a methyl diethanol amine (MDEA). The MDEA is activated to facilitate $CO_2$ absorption. For example, the amine may be activated with piperazine to reduce $H_2S$ levels while still releasing $CO_2$.

The gas processing facility may further include an incinerator. The incinerator receives the overhead by-products stream from the absorber vessel for burning and venting. Ideally, the overhead by-products stream contains very little $CO_2$.

In addition, the gas processing facility includes a compressor station. The compressor station receives the second acid gas stream from the regenerator vessel, and provides pressure to the second acid gas stream for injection into a subsurface reservoir. In one aspect, a plurality of acid gas injection wells is provided for transmitting the second acid gas stream from the compressor station to the subsurface reservoir. In one instance, the overhead gas stream is used for enhanced oil recovery operations.

In one embodiment of the gas processing facility, a portion of the first acid gas stream from the acid gas removal facility is also taken to the compressor station and placed under pressure. The portion of the acid gas stream is then injected into the subsurface reservoir along with the second acid gas stream from the regenerator vessel.

Preferably, the gas processing facility also includes an acid gas enrichment facility. The acid gas enrichment facility receives the acid gas stream from the acid gas removal facility, and separates the acid gas stream into (i) an overhead $CO_2$-rich stream, and (ii) an $H_2S$-rich acid gas stream. In this instance, the acid gas stream received by the Claus sulfur recovery unit is the $H_2S$-rich acid gas stream. Further, the overhead $CO_2$-rich stream is directed from the acid gas enrichment facility to the compressor station and placed under pressure for injection into the subsurface reservoir along with the second acid gas stream from the regenerator vessel.

A method for processing a hydrocarbon gas stream is also provided. The method allows for the capture of additional $CO_2$. The $CO_2$ is then injected into a subsurface reservoir. The method is carried out at a gas processing facility.

The method first includes separating the hydrocarbon gas stream at an acid gas removal facility. The hydrocarbon gas stream comprises sulfurous components and carbon dioxide. The hydrocarbon gas stream is separated into (i) a sweetened gas stream, and (ii) a first acid gas stream comprised primarily of hydrogen sulfide and carbon dioxide.

The method also includes receiving the acid gas stream at a Claus sulfur recovery unit. The acid gas stream is separated into (i) a liquid stream of elemental sulfur, and (ii) a tail gas comprising acid gas impurities.

The method further includes receiving the tail gas at a tail gas treating unit. The tail gas is separated into (i) an overhead by-products stream from an absorber vessel, and (ii) a second acid gas stream from a regenerator vessel. Preferably, the absorber vessel utilizes an amine that absorbs both carbon dioxide and sulfurous components such that a majority of the carbon dioxide entering the tail gas treating unit is absorbed in the absorber vessel and released from the absorber vessel to the regenerator vessel along with sulfurous components as a rich solvent stream.

The method next includes providing pressure to the second acid gas stream from the regenerator vessel at a compressor station. Then, the method provides for injecting the second acid gas stream into a subsurface reservoir.

In one aspect, a portion of the acid gas stream from the acid gas removal facility is taken to the compressor station and placed under pressure for injection into the subsurface reservoir. The portion of the first acid gas stream is injected along with the second acid gas stream from the regenerator vessel.

Optionally, the method also comprises providing a plurality of acid gas injection wells. The plurality of acid gas injection wells transmits the acid gas stream from the regenerator vessel in the tail gas treating unit to the subsurface reservoir. This may be for sequestration or for enhanced oil recovery operations in the subsurface reservoir.

In one embodiment, the method also includes warming the rich solvent stream in a heat exchanger before it enters the regenerator vessel, and directing the warmed rich solvent stream into the regenerator vessel.

In another embodiment, the method further comprises separating residual amine and condensed water from carbon dioxide and sulfurous components in the acid gas stream in a condenser vessel. The residual amine and condensed water are directed back to the regenerator vessel. In this embodiment, the second acid gas stream from the regenerator vessel is taken through the condenser vessel before $CO_2$ and $H_2S$ are delivered to the compressor station.

Preferably, the method further comprises incinerating the overhead by-products stream from the absorber vessel. The method then includes venting the incinerated by-products stream into the atmosphere. Ideally, the by-products stream contains little $CO_2$ so that less $CO_2$ is vented to the atmosphere than in known processes. It is understood that the incinerator generates $CO_2$ as well.

In one arrangement, the gas processing facility further comprises an acid gas enrichment facility for receiving the first acid gas stream from the acid gas removal facility, and separating the acid gas stream into (i) an overhead $CO_2$-rich stream, and (ii) an $H_2S$-rich acid gas stream. In this arrangement, the method may further comprise:
  receiving the $H_2S$-rich acid gas stream as the acid gas stream at the Claus sulfur recovery unit;
  delivering the overhead $CO_2$-rich stream to the compressor station;
  providing pressure to the overhead $CO_2$-rich stream at the compressor station; and
  injecting the overhead $CO_2$-rich stream into the subsurface reservoir along with the second acid gas stream from the regenerator vessel of the tail gas treating unit.

BRIEF DESCRIPTION OF THE DRAWINGS

So that the manner in which the present invention can be better understood, certain illustrations and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
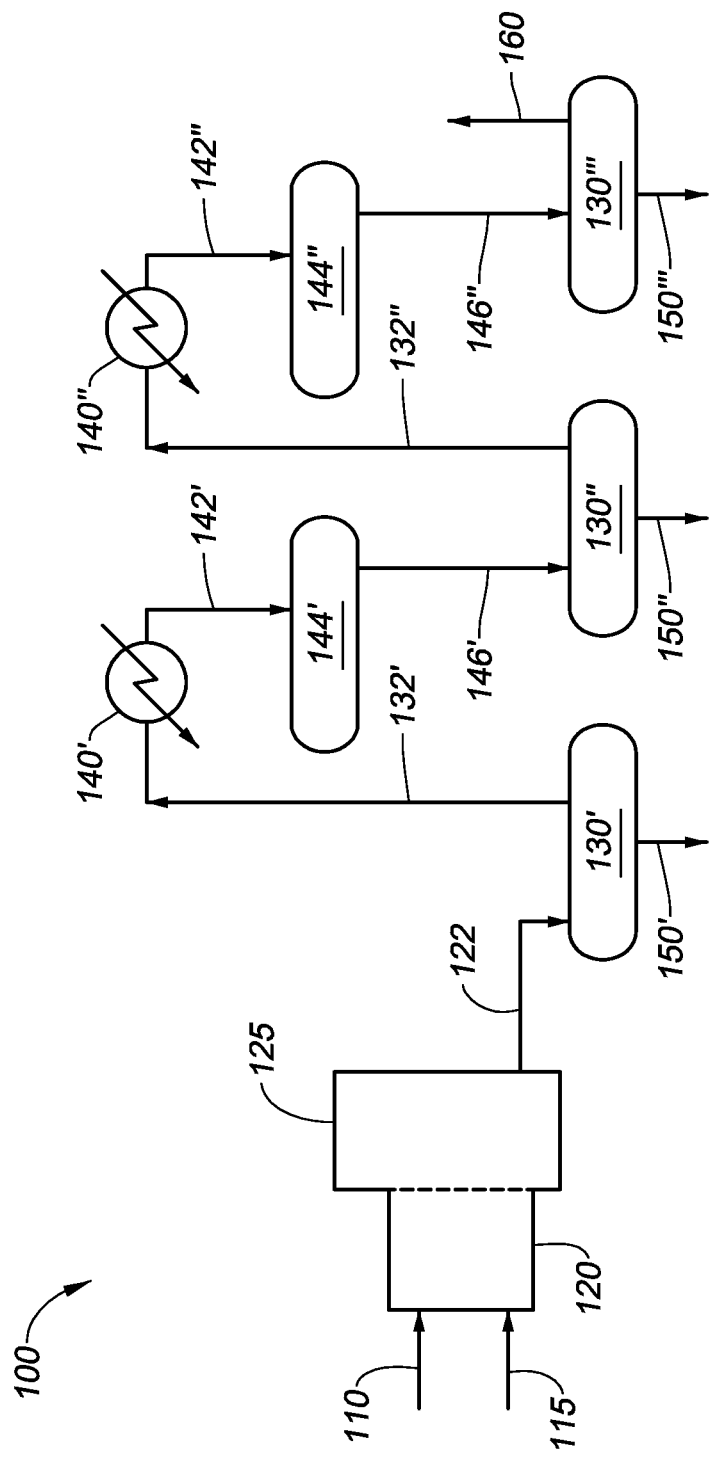
FIG. 1 is a schematic view of a gas processing facility for carrying out a sulfur removal process in accordance with a Claus reaction. Such a facility is known in the art of fluid component separation.

As used herein, the term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($C_1$) as a significant component. The natural gas stream may also contain ethane ($C_2$), higher molecular weight hydrocarbons, and one or more acid gases. The natural gas may also contain minor amounts of contaminants such as water, nitrogen, iron sulfide and wax.

As used herein, the term "acid gas" means any gas that dissolves in water producing an acidic solution. Nonlimiting examples of acid gases include hydrogen sulfide ($H_2S$), carbon dioxide ($CO_2$), sulfur dioxide ($SO_2$), carbon disulfide ($CS_2$), carbonyl sulfide (COS), mercaptans, or mixtures thereof.

"Flue gas" means any gas stream generated as a by-product of hydrocarbon combustion.

"Compressor" refers to a device for compressing a gaseous fluid, including gas-vapor mixtures or exhaust gases, and includes pumps, compressor turbines, reciprocating compressors, piston compressors, rotary vane or screw compressors, and devices and combinations capable of compressing a gas.

"Enhanced oil recovery" or "EOR" refers to the processes for enhancing the recovery of hydrocarbons from subterranean reservoirs. Techniques for improving displacement efficiency or sweep efficiency may be used for the exploitation of an oil or gas field by introducing displacing fluids or gas into injection wells to drive hydrocarbons through the reservoir to producing wells.

As used herein, the terms "catalytic" or "catalyst" relate to a material which under certain conditions of temperature and/or pressure increases the rate of specific chemical reactions or acts as a chemisorbent for specific components of a feed stream.

As used herein, the term "fluid" refers to gases, liquids, and combinations of gases and liquids, as well as to combinations of gases and solids, and combinations of liquids and solids.

"Flashing" means depressurizing a liquid through an expansion device or vessel with the conversion of a portion of the liquid to the vapor phase.

As used herein, "lean" and "rich," with respect to the absorbent liquid removal of a selected gas component from a gas stream, are relative, merely implying, respectively, a lesser or greater degree or extent of loading or content of the selected gas component, and do not necessarily indicate or require, respectively, either that the absorbent liquid is totally devoid of the selected gaseous component, or that it is incapable of absorbing more of the selected gas component. In fact, it is preferred, as will be evident hereinafter, that the so called "rich" absorbent liquid produced in contactor retains residual absorptive capacity. Conversely, a "lean" absorbent liquid will be understood to be capable of additional absorption, and may retain a minor concentration of the gas component being removed.

"Sour gas" means a gas containing undesirable quantities of acid gas, e.g., 55 parts-per-million by volume (ppmv) or more, or 500 ppmv, or 5 percent by volume or more, or 15 percent by volume or more. At least one example of a "sour gas" is a gas having from about 2 percent by volume or more to about 7 percent by volume or more of acid gas.

The term "industrial plant" refers to any plant that generates a gas stream containing at least one hydrocarbon or an acid gas. One nonlimiting example is a coal-powered electrical generation plant. Another example is a cement plant that emits $CO_2$ at low pressures.

The term "liquid solvent" means a fluid in substantially liquid phase that preferentially absorbs acid gases, thereby removing or "scrubbing" at least a portion of the acid gas components from a gas stream. The gas stream may be a hydrocarbon gas stream or other gas stream, such as a gas stream having hydrogen sulfide.

"Sweetened gas stream" refers to a fluid stream in a substantially gaseous phase that has had at least a portion of acid gas components removed.

As used herein, the term "hydrocarbon" refers to an organic compound that includes primarily, if not exclusively, the elements hydrogen and carbon. Hydrocarbons generally fall into two classes: aliphatic, or straight chain hydrocarbons, and cyclic, or closed ring, hydrocarbons including cyclic terpenes. Examples of hydrocarbon-containing materials include any form of natural gas, oil, coal, and bitumen that can be used as a fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at ambient conditions (15° C. and 1 atm pressure). Hydrocarbon fluids may include, for example, oil, natural gas, coal bed methane, shale oil, pyrolysis oil, pyrolysis gas, a pyrolysis product of coal, and other hydrocarbons that are in a gaseous or liquid state.

As used herein, the term "subsurface" refers to geologic strata occurring below the earth's surface.

Description of Specific Embodiments

Figure 3A:
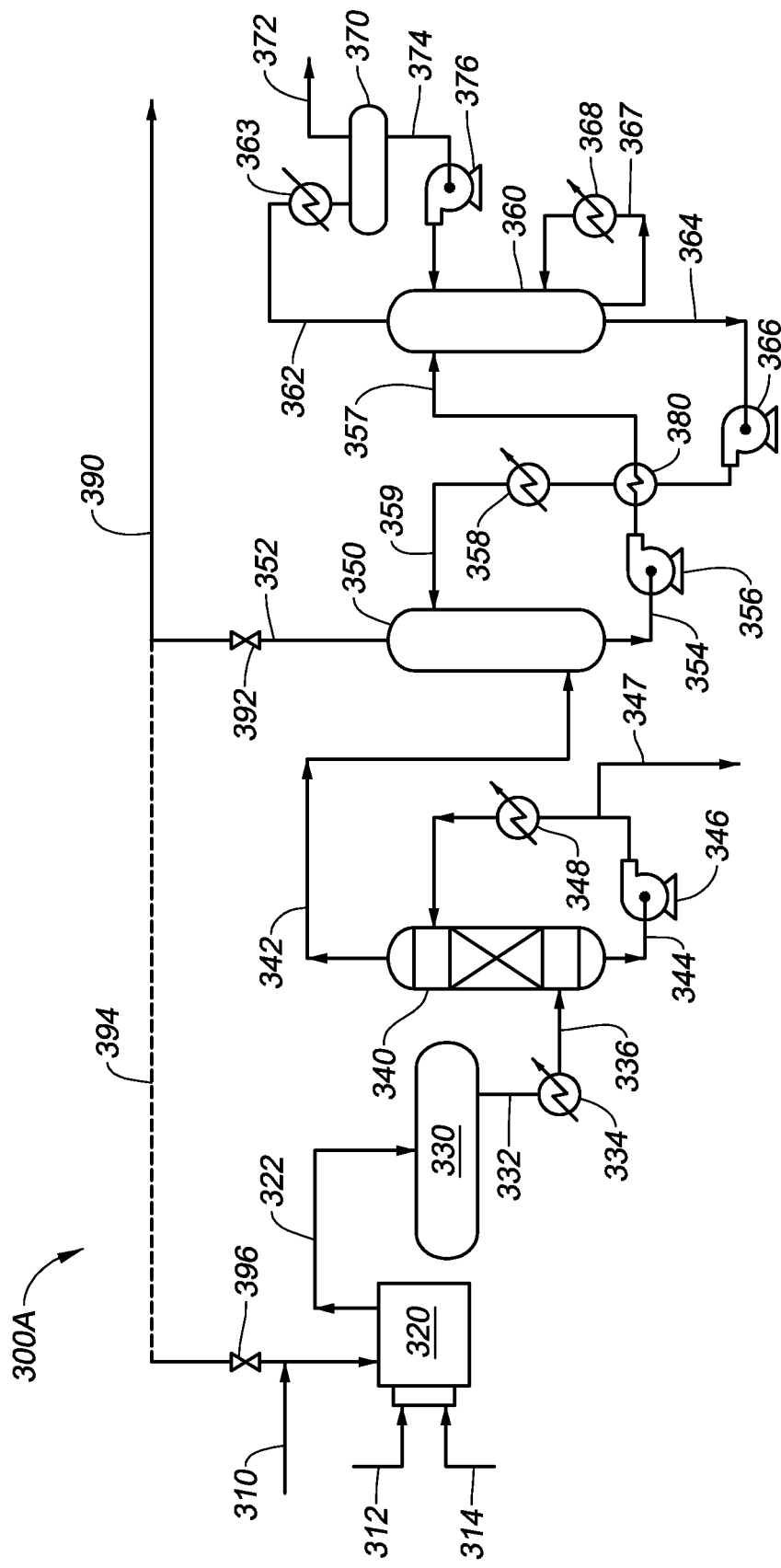
FIG. 3A is a schematic view of a tail gas treating unit as known in the gas processing industry.

FIG. 3A provides a schematic view of a tail gas treating unit 300A, as known in the gas processing industry. The tail gas treating unit (TGTU) 300A is generally in accordance with the Shell Claus Offgas Treating (SCOT) process mentioned above. The TGTU 300A receives a tail gas stream 310. The TGTU 300A also receives fuel gas through line 312, and a sub-stoichiometric air flow through line 314.

The tail gas stream 310, the fuel gas 312 and the air flow 314 are introduced into a reducing gas generator (RGG) 320. The RGG 320 typically does a sub-stoichiometric combustion of fuel gas in order to generate the hydrogen needed for the reduction of $SO_2$ and mercaptans to $H_2S$. The RGG 320 partially oxidizes the hydrocarbon components of the fuel gas to generate carbon monoxide and hydrogen. The hydrogen sulfide and carbon monoxide exit the RGG 320 through line 322, and are directed through a catalytic bed. Preferably, the catalytic bed 330 is a cobalt-molybdenum (Co—Mo) catalytic bed. The catalytic bed 330 facilitates the hydrogenation reactions. Together, the RGG 320 and the catalytic bed 330 hydrogenate the tail gas in the tail gas stream 310 to convert the $SO_2$ and mercaptans in the tail gas stream 310 to $H_2S$.

It is noted that the RGG 320 introduces more nitrogen, $CO_2$, and water vapor into the process. In addition, carbon monoxide is generated in the RGG 320. The carbon monoxide reacts with $H_2O$ on the sulfided Co—Mo catalyst bed 330 to generate more hydrogen and $CO_2$ via a known water-gas shift reaction. The water-gas shift reaction is as follows:

$$CO + H_2O \longrightarrow CO_2 + H_2$$

The presence of additional hydrogen assists in the conversion of $SO_2$ to $H_2S$ and water vapor.

An $H_2S$-containing gaseous stream is released from the catalyst bed 330 through line 332. The $H_2S$ stream is preferably cooled through a heat exchanger 334. A cooled $H_2S$-containing aqueous stream leaves the heat exchanger 334 as stream 336. The cooled $H_2S$-containing aqueous stream 336 then enters a quench tower 340.

The quench tower 340 operates primarily to remove water generated by the Claus reaction. Much of the excess water vapor is condensed and removed through line 344 as quench water. The quench water is passed through a pump 346, followed by a heat exchanger 348. The heat exchanger 348 acts to cool the quench water. Part of the quench water from line 344, now cooled, is reintroduced into the quench tower 340 near the top of the tower 340. The remaining water from line 344 is removed through a bleed-off line 347. Excess sour water may be removed through line bleed-off line 347 and used elsewhere in the tail gas treating unit 300A for cooling or, ideally, for agricultural purposes.

The quench tower 340 releases a cooled tail gas stream. This is shown at line 342. Here, the tail gas stream 342 comprises $H_2S$, $N_2$, $CO_2$, CO, and water vapor. To remove the $H_2S$, the cooled tail gas stream in line 342 is then contacted with an amine in an absorber 350.

The absorber 350 uses an $H_2S$-selective amine. The amine is usually methyl diethanol amine (MDEA) or an amine from the Flexsorb® family of amines discussed above. The amine captures the great majority of the $H_2S$, along with some level of $CO_2$. The amine originates at a solvent tank (not shown) proximate the absorber 350. Movement of the amine into the absorber 350 is aided by a pump that moves the amine into the absorber 350 under suitable pressure. The pump may, for example, boost pressure of the amine to 1,000 psig or higher.

The absorber 350 operates on the basis of a counter-current flow scheme. In this respect, acid gases are directed from line 342 and through the absorber 350 in one direction, while chemical solvent is directed through the absorber 350 in the opposite direction. The chemical solvent is introduced into the absorber 350 through line 359. As the two fluid materials interact, the downflowing solvent absorbs $H_2S$ from the upflowing sour gas to produce a "rich" solvent, that is, amine with the absorbed $H_2S$ and some incidental $CO_2$. The rich solvent passes through a bottom line 354.

The rich solvent in bottom line 354 is preferably taken through a booster pump 356. The rich solvent is then heat-exchanged through a heat exchanger 380. Heat exchanging is carried out with a regenerated solvent line 364 from a regenerator vessel 360. This allows the rich solvent to be preheated. The rich solvent then moves forward through line 357 into the regenerator vessel 360.

In the regenerator vessel 360, the amine is regenerated. This means that the amine is separated from the hydrogen sulfide in line 357 for re-use. The regenerator vessel 360 is a large-diameter vessel that operates at a pressure of about 15 to 25 psig. The regenerator vessel 360 defines a stripper portion typically comprising trays, packings or other internals (not shown) above a reboiler. A heat source 368 is provided to the reboiler to generate vapor traffic within the regenerator vessel 360. The reboiler typically uses steam as its heat source to boil off water and $H_2S$ from the amine.

The regenerator vessel 360 allows the rich solvent from line 357 to cascade down through trays or other internals. A portion of the regenerated amine is taken through bottom line 367. From there, the regenerated amine passes through a small heat exchanger as the heat source 368 for reheating, and is then reintroduced to the regenerator vessel 360.

However, a majority of the solvent is dropped through a bottom amine line 364. The bottom amine line 364 contains a lean solvent stream, which is at a temperature of about 265° F. The bottom amine line 364 carries lean amine through a booster pump 366. From there, the warm amine passes through the heat exchanger 380 mentioned above, where it warms the rich solvent from line 354. At the same time, thermal contact with the rich solvent from line 354 serves to partially cool the lean amine in bottom amine line 364. The cooled amine may be reheated through a heat exchanger 358. The cooled amine is then carried to the top of the absorber vessel 350 through line 359.

Figure 2:
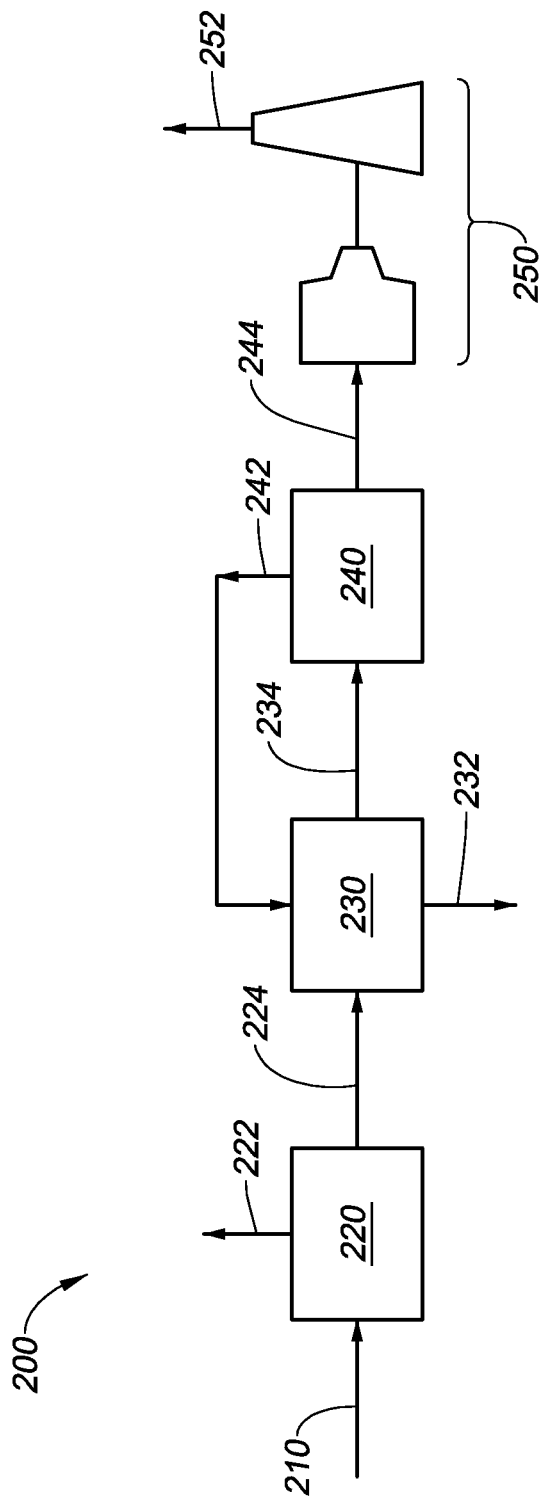
FIG. 2 is a schematic view of a known gas processing facility for removing acid gas components from a raw natural gas stream. The facility includes an acid gas removal facility, a Claus sulfur recovery facility, a tail gas treating unit, and an incinerator.

The absorber vessel 350 releases an overhead by-products line 352. The gas in the overhead by-products line 352 again comprises $N_2$, water vapor, and some of the $CO_2$. These overhead by-products in line 352 are delivered to a release line 390. Release line 390 takes the overhead by-products to an incinerator. Thus, line 390 is comparable to line 244 from FIG. 2, which shows gases being released from the tail gas treating unit 240 and directed to an incinerator 250. A valve 392 may be employed to control the flow of gases to the incinerator 250.

It is noted that the by-products in line 352 may and almost certainly will contain some $H_2S$. $H_2S$ that slips past the absorption step provided by the absorber vessel 350 usually goes to the incinerator with the $CO_2$ and other gases, and eventually counts against the allowable $SO_2$ emission limit. (Those of ordinary skill in the art will know that burning $H_2S$ creates $SO_2$.) It is, however, optional, to bypass the incinerator, particularly during start-up and catalyst sulfiding procedures, and to route the gases in line 352 back to the RGG 320, as indicated by dashed line 394. Valve 396 is provided to control the bypass flow through line 394. When the valve 396 is open, the by-products from the absorber vessel 350 (from line 352 and then line 394) is merged with the tail gas stream 310.

Returning to the regenerator vessel 360, the regenerator vessel 360 also has an overhead line 362. The overhead line 362 releases the hydrogen sulfide (and incidental $CO_2$) that flashes from the amine in the regenerator vessel 360. The sour gas in line 362 will inevitably contain trace amounts of amine and water. Therefore, the $H_2S$-rich sour gas is preferably carried through overhead line 362 to a heat exchanger 363 where it is cooled, and then dropped to a small condensing vessel 370. The heat exchanger 363 serves to cool the $H_2S$-rich sour gas in overhead line 362. The heat exchanger 363 may be an air fan cooler or may be a heat exchanger using fresh water or sea water. Cooling the $H_2S$-rich sour gas in line 362 serves to knock out water. This helps to minimize the required water make-up. Given the presence of acid gas and free water, this portion of the system is usually clad with high-alloy metal.

The condensing vessel 370 produces an $H_2S$-rich acid gas. The $H_2S$-rich acid gas is released from the condensing vessel 370 through overhead line 372. In the known TGTU 300A, the $H_2S$-rich acid gas is recycled back to the front of the Claus sulfur recovery unit. This is represented more fully at line 242 in FIG. 2, where the $H_2S$-rich acid gas is delivered back to the Claus SRU 230.

Water and amine drop from the condensing vessel 370 through bottom line 374. Together, the water and amine are taken through a pressure booster 376. The water and amine are reintroduced into the top of the regenerator vessel 360.

Some of the water is re-vaporized, but most water travels down the regenerator vessel 360 with the lean amine, and is thus recycled.

As noted above, a tail gas treating unit such as unit 300A of FIG. 3 may release a large amount of $CO_2$. The $CO_2$ is released through the overhead by-products line 352 from the absorber vessel 350. A lesser amount of $CO_2$ is released with the $H_2S$-rich acid gas stream in overhead line 372. It is desirable to reduce $CO_2$ emissions from a tail gas treating unit, such as unit 300A. However, it would be costly to capture the carbon dioxide from the treated tail gas stream 390 before incineration, as it would typically involve a second solvent-based capture system, including at least one contactor vessel and a regenerator tower.

To address this shortcoming in the technology, it is proposed herein to employ a more reactive solvent in a TGTU, such as TGTU 300A. As noted above, existing procedures for a TGTU usually employ methyl diethanol amine (MDEA) or an amine from the Flexsorb® family of chemical solvents discussed above. These amines are heavily $H_2S$-selective. Such amines capture the great majority of the $H_2S$, but only a small amount of $CO_2$. Therefore, it is proposed herein that the $H_2S$-selective solvent be replaced with a more reactive solvent. A more reactive solvent will not only absorb $H_2S$ molecules, but will also capture a substantial percentage of carbon dioxide.

More reactive solvents include:
diethanol amine (DEA);
di-isopropanol amine (DIPA); and
monoethanol (MEA).

These are considered primary or secondary amines.

Another amine that would be effective in capturing $CO_2$ along with $H_2S$ molecules is an activated MDEA. This means that a relatively small amount of an activator is added to an MDEA absorber to aid in $CO_2$ absorption. Such an activator may be, for example, piperazine. Piperazine is a type of amine that, if added to MDEA, facilitates the pick-up of $CO_2$.

Any of these chemical solvents is capable of picking up most of the $CO_2$, along with virtually all of the $H_2S$, while slipping the nitrogen and any unreacted hydrogen to the incinerator. Any of these solvents would also allow water vapor in the absorber (such as absorber 350 in FIG. 3A) to be delivered to the incinerator. Most importantly, little, if any, $CO_2$ passes to the overhead by-products line 352 from the absorber vessel 350.

After absorbing both $H_2S$ and $CO_2$, the rich solvent stream 354 is then regenerated. This produces an acidic gas comprised of solvent plus $H_2S$ and $CO_2$, but substantially free of nitrogen and other light gases. The absence of nitrogen and other light gases (such as helium) makes a later acid gas injection (AGI) operation easier because it is easier to condense the acid gas into a dense phase, that is, a substantially liquid phase. Hydrostatic head of the condensed acid gas, now substantially in liquid phase, may be used to advantage in the wellbores to help push it into the reservoir. The acid gas stream being injected into a reservoir is suitable for use for Enhanced Oil Recovery since it is free of the light gases and nitrogen that typically require much higher pressures to be miscible with reservoir oil.

Removal of carbon dioxide from the overhead by-products line 352 not only provides a source of fluid for an EOR operation and not only reduces the emission of $CO_2$ into the atmosphere, but also reduces the load on the incinerator 250. This means that the incinerator 250 consumes less fuel gas, which in turn reduces the amount of $CO_2$ the incinerator 250 generates via combustion.

As an alternative means of capturing $CO_2$ to avoid venting the $CO_2$ into the atmosphere, and as a further improvement to the tail gas treating unit 300A, the incinerator 250 may use a catalytic incineration process. This is as opposed to a fuel gas combustion process. A catalytic incineration process requires lower temperatures to combust the $H_2S$ along with any residual hydrocarbons, such as from an acid gas enrichment unit. Some preheating of the overhead by-products stream 244 is done, air is added, and the mixture is flowed to a catalyst bed. The catalyst facilitates oxidation of hydrocarbons to $CO_2$, and water vapor and $H_2S$ to $SO_2$. Those of ordinary skill in the art will understand that a catalytic incineration system would preferably be designed to handle "upsets" from the TGTU that may result in temporary increases in the level of $H_2S$ flowing to it.

The above design changes to a tail gas treating unit may be implemented during the design phase of a new gas treating facility. However, and beneficially, the above design changes can be implemented by retrofitting an existing plant. For example, an existing Claus tail gas treating unit may be modified by changing out the legacy solvent or by adding an activator to the legacy solvent. In this instance, overhead sour gas line 372 now comprises both $H_2S$ and $CO_2$ gases. As discussed further in connection with FIG. 4, below, these gases may then be condensed, compressed, and injected into a subsurface reservoir.

Additional equipment may also be necessary to supplement the regeneration capacity of the solvent system. This is because additional heat and, possibly, higher solvent circulation rate, may be necessary to regenerate the solvent in line 357 that is carrying the additional $CO_2$ (along with the baseline $H_2S$). Solvents that tend to be more reactive with $CO_2$ will generally have a higher heat of reaction, which means that the temperature in the rich amine solution (line 354) is now increased. The temperature in the top of the absorber vessel 350 is typically about 100° F. By the time counter-current mixing has finished in the absorber vessel 350, the temperature of the rich amine solution at the bottom of the absorber vessel 350 is up to about 160° F. This additional heat of reaction must also be added back in the regeneration process.

Figure 3B:
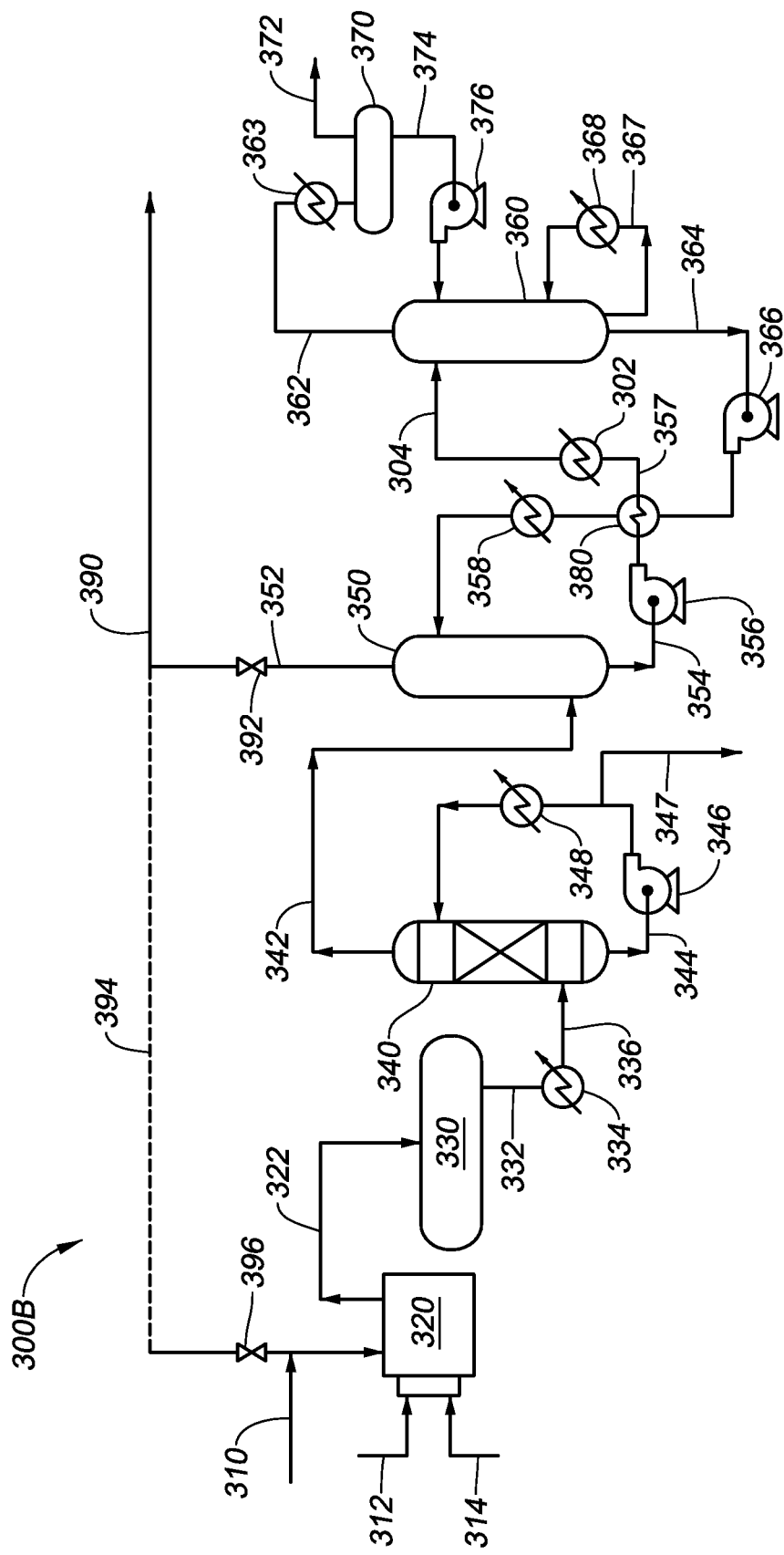
FIG. 3B is a schematic view of a modified tail gas treating unit of the present invention, in one embodiment.

FIG. 3B presents a schematic view of a modified tail gas treating unit 300B of the present invention, in one embodiment. The TGTU 300B is similar to the TGTU 300A of FIG. 3A. In this respect, tail gas treating unit 300B of FIG. 3B also has a reducing gas generator (RGG) 320 and a catalytic bed 330. Together, the RGG 320 and the catalytic bed 330 hydrogenate the tail gas in the tail gas stream 310 to facilitate a hydrogenation reaction that converts $SO_2$ and mercaptans in the tail gas stream 310 to $H_2S$. The tail gas treating unit 300B also has an absorber vessel 340 and a solvent regenerator vessel 350. However, a more $CO_2$-selective amine solvent is used in the absorber vessel 340, and additional equipment has been added.

It can be seen that a dedicated heater 302 is provided along rich solvent line 357 after the heat exchanger 380. The dedicated heater 302 pre-heats the rich solvent in line 357 before it enters the regenerator vessel 360. Pre-heating the rich solvent enables at least a portion of the $H_2S$ and $CO_2$ to enter the gas phase. The pre-heated rich solvent then travels through line 304. The pre-heated rich solvent in line 304 is directed into the top of the regenerator 360.

Ultimately, the acid gas components from overhead line 362 are released from condensing vessel 370 into overhead gas line 372. The acid gases are then passed through a compressor station and injected into a subsurface reservoir.

It is understood that in this modified acid gas processing arrangement 300B, additional equipment will be required to compress and inject $CO_2$ along with the $H_2S$. In addition, corrosion inhibitors may be needed to retard the reaction of $CO_2$ with the steel in the solvent contacting process.

The modified tail gas treating unit 300B of FIG. 3B substantially reduces the amount of carbon dioxide vented into the atmosphere from a hydrocarbon gas processing facility. In this respect, $CO_2$ is substantially no longer released through overhead by-products line 352 or transported to the incinerator 250 through line 390; instead, $CO_2$ is primarily released with the overhead sour gas stream 372, and sequestered. This is demonstrated in FIG. 4.

Figure 4:
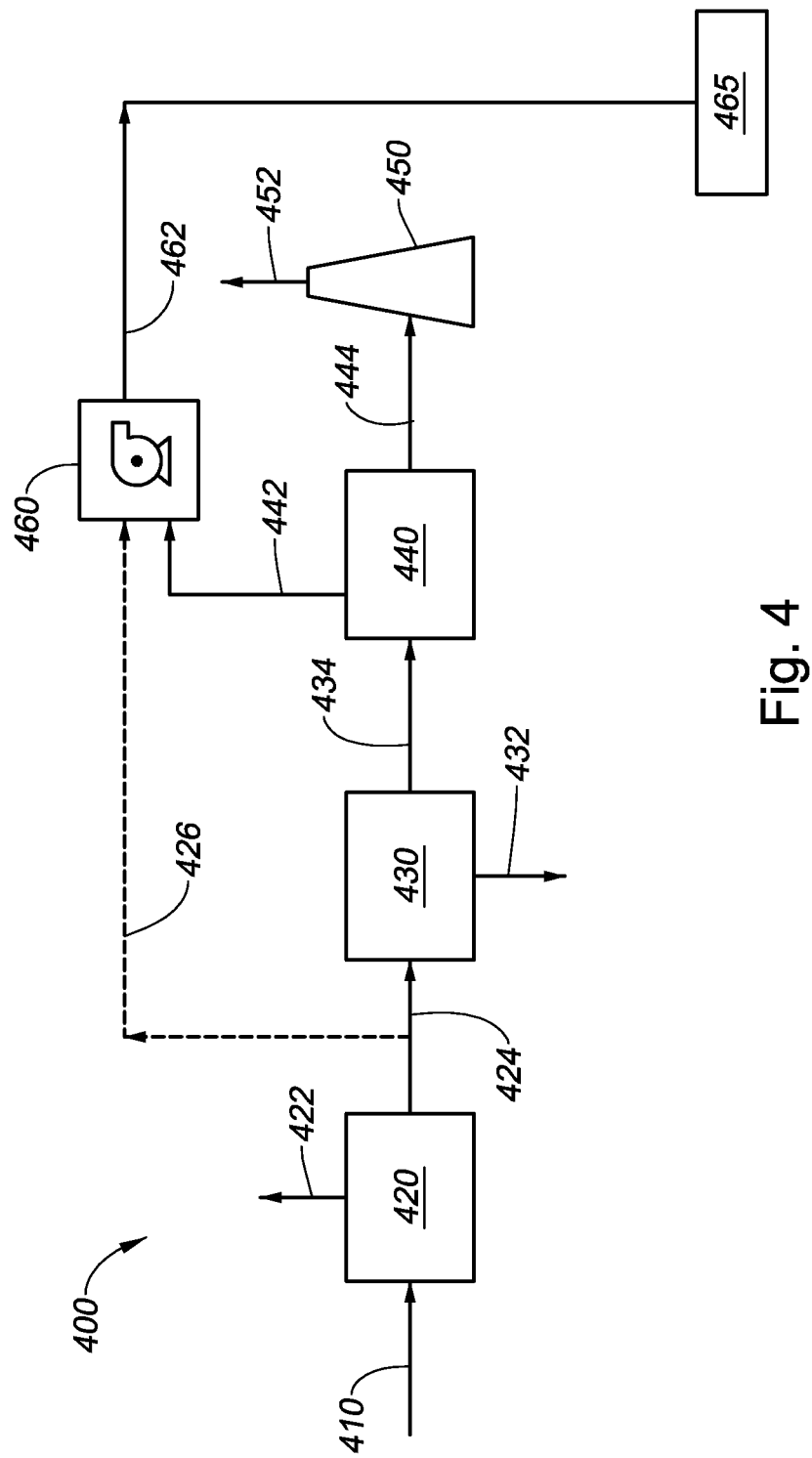
FIG. 4 is a schematic view of a gas processing facility of the present invention, in one embodiment. Here, a portion of the acid gas removed from the acid gas removal facility is sent directly to a compressor station for acid gas injection.

FIG. 4 shows a schematic view of a gas processing facility 400 of the present invention, in one embodiment. The facility 400 is essentially the gas processing facility 200 of FIG. 2. However, the overhead sour gas stream is now directed to a compressor station for pressurization and acid gas injection. In addition, a portion of the acid gas removed from the acid gas removal facility 220 is now sent directly to the compressor station for acid gas injection.

In FIG. 4, a raw gas stream 410 is shown entering an acid gas removal facility 420. The gas stream 410 may be, for example, raw natural gas from a hydrocarbon recovery operation. However, it may alternatively be a flue gas stream from an industrial power plant or other plant.

In the context of an oil and gas operation, the gas stream 410 contains at least one hydrocarbon gas component, principally methane. In addition, the gas stream 410 contains carbon dioxide, hydrogen sulfide and, perhaps, other acid gas components. The acid gas removal facility 420 operates to separate out the acid gas components from the hydrocarbon gases. This may done, for example, through the various solvent reaction processes discussed above. Alternatively, a cryogenic separation process may be employed, such as the use of the Controlled Freeze Zone™ (CFZ) process created by ExxonMobil Upstream Research Company.

In FIG. 4, a sweetened gas stream is seen exiting the acid gas removal facility 420 overhead. This is shown at line 422. In addition, an acid gas stream is seen exiting the acid gas removal facility 420 as a bottoms stream. This is shown at line 424. The acid gas stream 424 contains primarily carbon dioxide and hydrogen sulfide, and enters a Claus reactor facility 430. The Claus reactor facility 430 serves as a sulfur recovery unit. This may be in accordance with the sulfur recovery unit 100 shown and described in connection with FIG. 1, above.

In FIG. 4, an elemental sulfur stream is shown exiting the Claus reactor facility 430. This is seen at 432. The elemental sulfur is typically released from a condenser as a molten liquid, and then hardens as it freezes.

A tail gas stream also exits the Claus reactor facility 430, through line 434. The tail gas stream 434 is directed to a TGTU. The TGTU is shown at 440. In the TGTU 440, the tail gas stream 434 is "cleaned." The TGTU 440 may be in accordance with the tail gas treating facility 300B shown and described in connection with FIG. 3B. In the arrangement of FIG. 4, hydrogen sulfide with carbon dioxide is directed from the TGTU 440 through acid gas line 442. This is in accordance with lines 362 and 372 of FIG. 3B.

The acid gases in line 442 are directed to a compressor station 460. From there, the compressed acid gases are directed through line 462, and then injected into a reservoir. The reservoir is depicted schematically at block 465. The acid gases from line 462 are thus sequestered in a subsurface location rather than being vented or recycled back to the sulfur recovery unit 430 as shown at line 242 in FIG. 2.

The remaining products, consisting primarily of nitrogen, water vapor, small amounts of carbon dioxide, and traces of hydrogen are directed to an incinerator 450. These by-products exit the tail gas treating unit 440 through line 444. This is in accordance with lines 352 and 390 in FIG. 3B. These by-products are burned and vented to the atmosphere through vent line 452.

It is also noted from FIG. 4 that a portion of the acid gases from line 424 are by-passed around the sulfur recovery unit 430. This is shown in line 426. The acid gases in line 426 are directed to the compressor station 460 and merged with the acid gas stream 442 leaving the tail gas treating unit 440. The acid gases from lines 426 and 442 are then compressed and sent to injection line 462. Thus, overall acid gas venting into the atmosphere is reduced.

By way of example, if a field produces 1 billion cubic feet of feed gas per day with a 5% $CO_2$ content, a 90% recovery would capture nearly 1 million tons of $CO_2$ per year. Considering the large number of existing Claus units processing gas with at least some level of $CO_2$, this could amount to many million tons per year of additional $CO_2$ captured.

Another way to reduce $CO_2$ emissions disclosed herein relates to the process of acid gas enrichment (AGE). In some gas processing applications, the $H_2S$ content of the original acid gas (bottom acid gas stream from line 424 in FIG. 4) is too low to make the conventional Claus SRU function properly. The Claus furnace 120 generally requires a sulfurous component content of at least 40% for "straight through" Claus design, and more preferably greater than 50% $H_2S$. In these cases, it is known to "enrich" the acid gas with respect to $H_2S$ by removing $CO_2$ from the acid gas stream in line 424, and delivering the $CO_2$-rich stream directly to the incinerator 450. In one or more embodiments, the acid gas line 442 is directed to an acid gas enrichment facility thereby generating a "cleaner" $CO_2$.

Figure 5A:
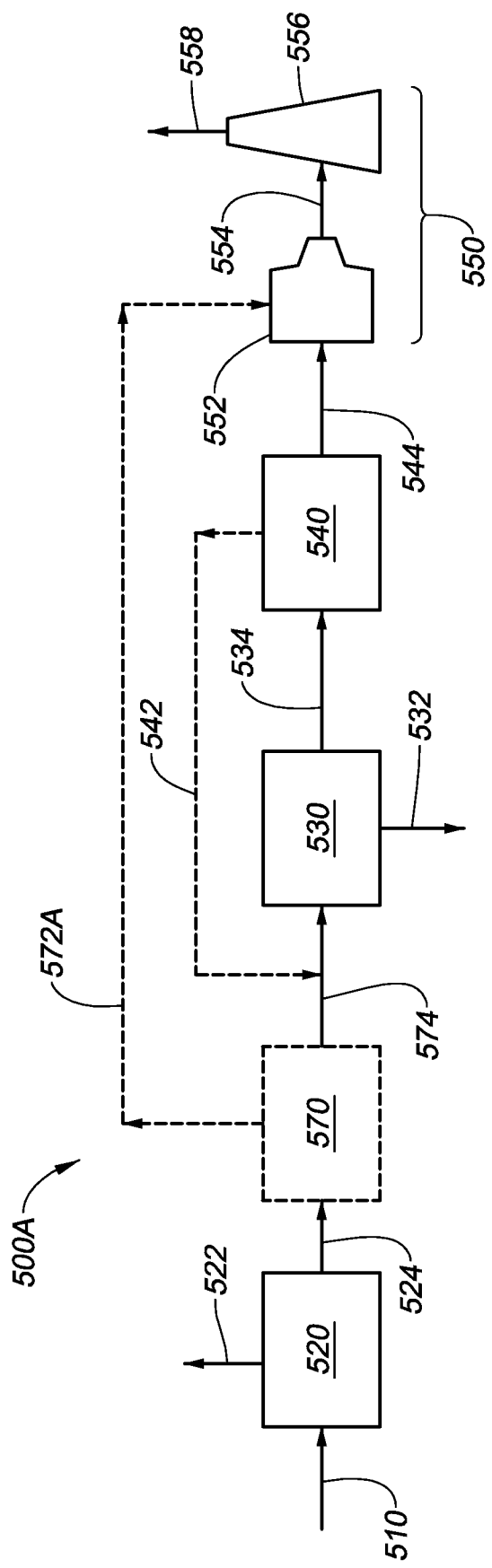
FIG. 5A is a schematic view of a known gas processing facility for the removal of acid gases. Here, acid gas enrichment is provided before $H_2S$ is passed to a Claus sulfur recovery unit, with carbon dioxide being diverted around the Claus sulfur recovery unit and directed into an incinerator.

FIG. 5A provides a schematic diagram of a known gas processing facility 500A for treating acid gas captured from an acid gas removal system. In FIG. 5A, a raw gas stream 510 is shown entering an acid gas removal facility 520. The gas stream 510 preferably comprises raw natural gas from a hydrocarbon recovery operation. Optionally, the raw natural gas stream 510 has undergone dehydration such as through the use of glycol. Further, the raw natural gas stream 510 has preferably passed through an inlet separator (not shown) to filter out impurities such as brine and drilling fluids.

The gas stream 510 contains at least one hydrocarbon gas component, principally methane. In addition, the gas stream 510 contains acid gases. The acid gas removal facility 520 operates to separate out the acid gas components from the hydrocarbon gases. This may done, for example, through the various solvent reaction processes discussed above. Alternatively, a cryogenic separation process may be employed, such as the use of the Controlled Freeze Zone™ (CFZ) process.

In FIG. 5A, a sweetened gas stream is seen exiting the acid gas removal facility 520 overhead. This is shown at line 522. In addition, an acid gas stream is seen exiting the acid gas removal facility 520 as a first acid gas stream. This is shown at line 524. The acid gas stream 524 contains primarily carbon dioxide and hydrogen sulfide, and enters a Claus reactor 530. The Claus reactor 530 serves as a SRU.

As discussed above in connection with FIG. 1, the Claus sulfur recovery facility 530 operates to break sulfurous components in the acid gas stream down into elemental sulfur. In FIG. 5A, an elemental sulfur stream is shown exiting the Claus sulfur recovery facility 530. This is seen at 532. A tail gas stream also exits the Claus sulfur recovery facility 530, through line 534.

The tail gas stream 534 is directed to a TGTU. The TGTU is shown at 540. In the TGTU 540, the tail gas stream 534 is "cleaned." In the arrangement of FIG. 5A, hydrogen sulfide is directed from the TGTU 540, and recycled back to the front end of the Claus sulfur recovery facility 530 in accordance with known procedures. This is seen at line 542. Alternatively, hydrogen sulfide is directed from the TGTU 540 and recycled back to an acid gas enrichment facility 570, thereby generating a "cleaner" $CO_2$. The remaining TGTU products, consisting primarily of carbon dioxide along with water vapor and nitrogen, are directed to an incinerator 550 through line 544. These by-products are burned and vented to the atmosphere through vent line 558.

In order to increase the efficiency of the Claus sulfur recovery facility 530, the acid gas stream in line 524 is passed through an acid gas enrichment (AGE) facility. This is shown in phantom at block 570. The AGE facility 570 releases a portion of the carbon dioxide in the acid gas stream 524 through overhead line 572A. The release of $CO_2$ is typically done by the use of an $H_2S$ selective amine in a chemical solvent process. The process may utilize an $H_2S$-selective amine, e.g., sterically hindered amines such as MDEA or Flexsorb®, allowing the carbon dioxide to pass upward as an overhead gas stream. Optionally, the sterically hindered amine may be activated with piperazine to reduce $H_2S$ levels, while still releasing $CO_2$. Line 572A may also contain some water vapor, $H_2S$, and hydrocarbon gas, but still represents a $CO_2$-rich gas stream. The $CO_2$-rich gas stream in line 572A is taken around the Claus SRU 530 and the TGTU 540 to the incinerator 550.

In operation, the carbon dioxide and other gases in line 572A are merged with the non-sulfurous by-products of the TGTU 540, which have been released in line 544. Line 544 of FIG. 5A is comparable to line 352 in FIG. 3A, which consists primarily of nitrogen, water vapor, helium, and carbon dioxide. The $CO_2$ and other components from line 572A (or line 544) are directed to a heating area 552 in the incinerator 550, and then passed to a stack 556. The $CO_2$ and other by-products are burned together and vented to the atmosphere through vent line 558.

The AGE facility 570 also passes acid gas comprised primarily of $H_2S$, along with a lesser amount of carbon dioxide. The $H_2S$-enriched acid gas is released through line 574, where it enters the Clause SRU 530. The $H_2S$ is substantially converted to elemental sulfur and deposited through line 532 as a molten liquid. This represents standard practice for sulfur recovery.

A side benefit of using an AGE facility 570 is that hydrocarbons, particularly any heavy hydrocarbons that have desorbed into the acid gas stream 524, are slipped to the overhead gas line 572A instead of the Claus sulfur recovery unit 530. This improves performance of the Claus SRU 530, and reduces demand for air through air line 314.

As an alternative to the gas processing system 500A shown in FIG. 5A, it is proposed herein to deliver the $CO_2$-rich gas in overhead gas line 572A to a compressor station. The $CO_2$ may then be compressed and injected into a reservoir rather than being vented to the atmosphere.

Figure 5B:
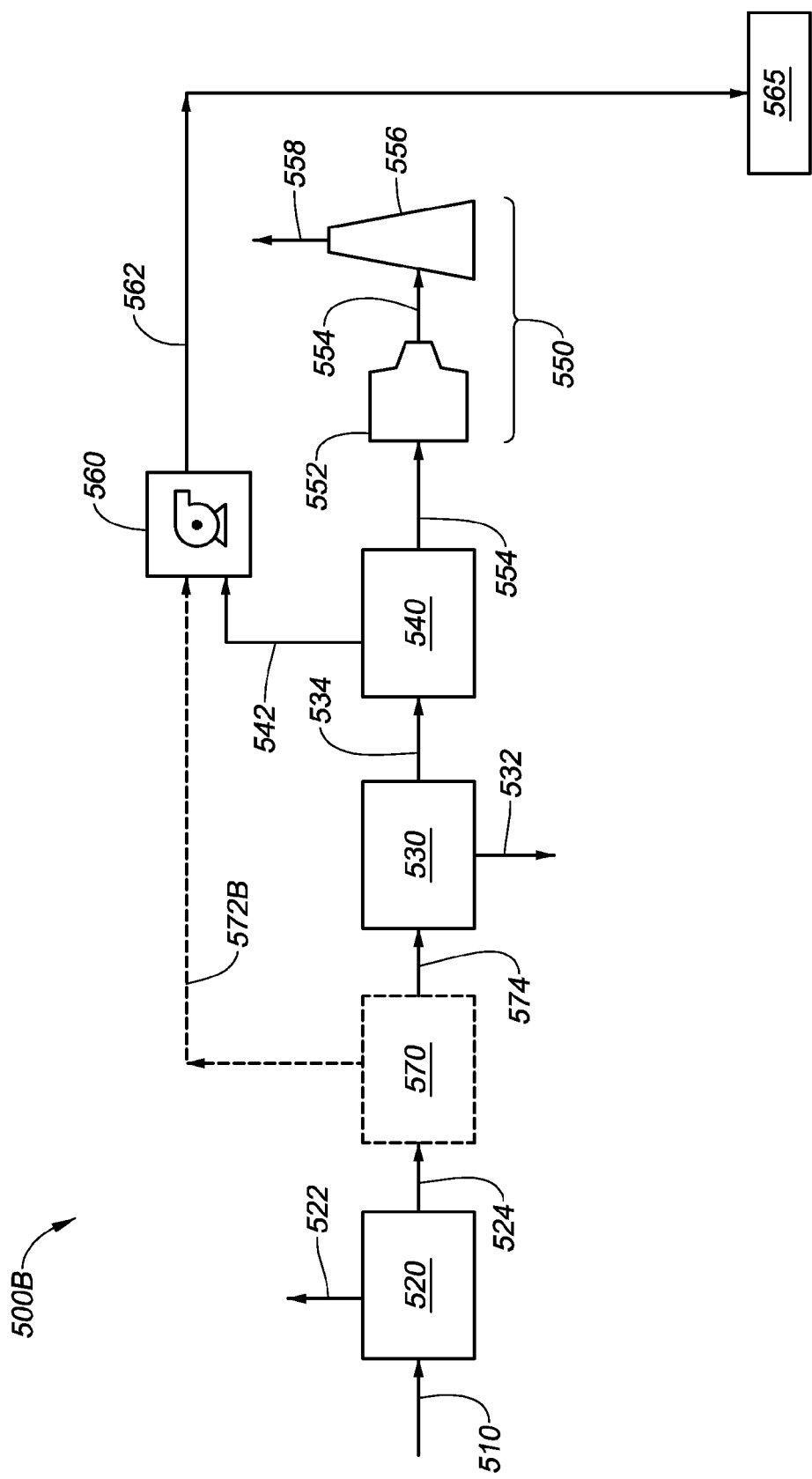
FIG. 5B is a schematic view of a gas processing facility for the removal of acid gases, in a modified embodiment. Here, acid gas enrichment is again provided before $H_2S$ is passed to a Claus sulfur recovery unit, but the carbon dioxide is now sent to the compressor station for acid gas injection.

FIG. 5B presents a schematic view of a gas processing facility 500B for the removal of acid gases, in a modified embodiment. Gas processing facility 500B is similar to gas processing facility 500A. In this respect, gas processing facility 500B receives a raw natural gas stream 510. The natural gas stream 510 is directed into an acid gas removal system 520. The acid gas removal system 520 releases a sweetened overhead gas stream 572 and an acid gas stream 524. The gas processing facility 500B also includes an acid gas enrichment (AGE) facility 570. The AGE facility 570 receives the acid gas stream 524, and then releases a $CO_2$-rich overhead gas stream 572 and an $H_2S$-rich acid gas stream 574.

The gas processing facility 500B also includes a Claus reactor 530. The Claus reactor 530 serves as a sulfur recovery unit. The Claus reactor 530 receives the $H_2S$-rich acid gas stream 574 from the acid gas removal system 520 through line 524, and deposits elemental sulfur 532 through an oxidation process such as the process discussed above in connection with FIG. 1. The Claus reactor 530 also releases a tail gas stream through line 534.

The tail gas stream in line 534 is directed to a tail gas treating unit 540. The TGTU 540 "cleans" the tail gas in line 534 such as discussed above in connection with FIG. 3B. The TGTU 540 releases an overhead by-products gas stream 554 (comparable to line 352 in FIG. 3B) from the absorber vessel 350. The TGTU 540 also releases a sour gas stream 542 (comparable to lines 362B and 372 in FIG. 3B). The by-products gas stream 554 enters the incinerator 550 where the water vapor, hydrogen, nitrogen, and $H_2S$ components are burned and vented to the atmosphere. At the same time, the sour gas stream 542 (comparable to acid gas overhead line 372 in FIG. 3B) is taken to a compressor station 560 (comparable to the compressor station 460 of FIG. 4). Alternatively, the sour gas stream 542 can be recycled to an AGE facility.

In order to increase the efficiency of the Claus reactor facility 530, the gas processing facility 500B also includes the acid gas enrichment facility 570. The AGE facility 570 receives the acid gas stream in line 524. The AGE facility 570 removes a portion of the carbon dioxide in the acid gas stream 524 and releases it as a $CO_2$-rich gas through overhead line 572B. The remaining $H_2S$-rich acid gas is passed through line 574 to the Claus sulfur recovery facility 530. Thus, acid gas enrichment takes place between the acid gas removal system 520 and the Claus sulfur recovery facility 530.

The carbon dioxide may be separated from the sulfurous components in the AGE facility 570 by utilizing an amine solvent, as mentioned above. In connection with the chemical solvent process for removing $CO_2$, an absorber vessel and a regenerator vessel are utilized. The rich amine solution from the absorber vessel may optionally be "flashed" in a flash vessel before it reaches the regenerator vessel.

The $CO_2$-rich gas is released from the acid gas enrichment facility 570 through overhead line 572B. Line 572B in FIG. 5B differs from line 572A in FIG. 5A. Line 572B directs the $CO_2$-rich gas to the compressor station 560. Thus, rather than incinerating and venting the $CO_2$-rich gas as is done in FIG. 5A, the $CO_2$ is captured and sequestered in a subsurface reservoir 565. This was also shown at line 442 in FIG. 4, where the gas processing facility 400 includes a compressor station 460.

Since the overhead gas stream in line 572B is comprised primarily of $CO_2$ and typically contains very small concentrations of light gas components like nitrogen and methane, the gas is comparatively easy to compress and condense. Injection of this $CO_2$-rich gas stream readily reduces the "$CO_2$ footprint" of the gas treating facility 500B. Such an operation also improves the sulfur recovery efficiency of the facility 500B as the residual sulfur in the $CO_2$-rich overhead gas line 572B is not incinerated and released to the atmosphere, or recycled back to the Claus SRU 530.

In another aspect of the gas processing facility 500B, a single stage co-current contactor may be employed as part of the tail gas treating unit 540. The co-current contactor may be, for example, the ProsCon contactor manufactured by ProsCon of Cork, Ireland. This contactor utilizes an eductor followed by a centrifugal coalescer. The centrifugal coalescer induces large centrifugal forces to re-integrate the liquid solvent in a small volume.

The co-current contactor is placed into the tail gas treating unit 540 upstream of the absorber. The contactor received fresh amine from the acid gas enrichment facility 570. Because the contact time within a co-current contactor is so short, $H_2S$ is preferentially absorbed from the tail gas (such as tail gas in line 534 of FIG. 5B).

An $H_2S$-rich amine solution is released from the co-current contactor. This $H_2S$-rich amine solution is sent to a regenerator for the acid gas enrichment facility 570. There, the rich amine is combined with rich amine from the acid gas enrichment facility 570, and $H_2S$ is separated from the amine component to create a regenerated amine stream.

The $H_2S$ driven from the $H_2S$-rich amine solution is passed to the Claus sulfur recovery unit 530. There, the $H_2S$ is converted to elemental sulfur and released with the liquid sulfur stream 532. Meanwhile, the gas that passes through the single stage co-current contactor is delivered to the absorber (such as absorber 350 of FIG. 3B) for the tail gas treating unit 540. There, $CO_2$ and any remaining $H_2S$ will be absorbed and released through line 354. The result is that the overhead sour gas stream (line 372 from FIG. 3B or line 542 from FIG. 5) will contain less $H_2S$, and will be more suitable for enhanced oil recovery operations upon injection into the subsurface reservoir 565.

In this embodiment, the gas processing facility 500B therefore comprises a single-stage, co-current contactor placed between the Claus sulfur recovery unit and the absorber vessel of the tail gas treating unit for (i) at least partially removing $H_2S$ from the tail gas before it is delivered to the absorber vessel, and (ii) releasing a $CO_2$-rich stream to the absorber vessel in the tail gas treating unit.

It will be appreciated that FIGS. 3A, 3B, 4, 5A, and 5B present highly schematic diagrams intended to make clear only selected aspects of the gas processing methods disclosed herein. A gas processing facility will include many detailed components such as chillers, heat exchangers, condensers, fluid pumps, gas compressors, blowers, other types of separation and/or fractionation equipment, valves, switches, controllers, and pressure-, temperature-, level-, and flow-measuring devices.

As part of the disclosure herein, a method for processing a hydrocarbon gas stream is also provided herein. The method allows for the capture of additional $CO_2$ and for the sequestration of the captured $CO_2$ in a subsurface reservoir.

Figure 6:
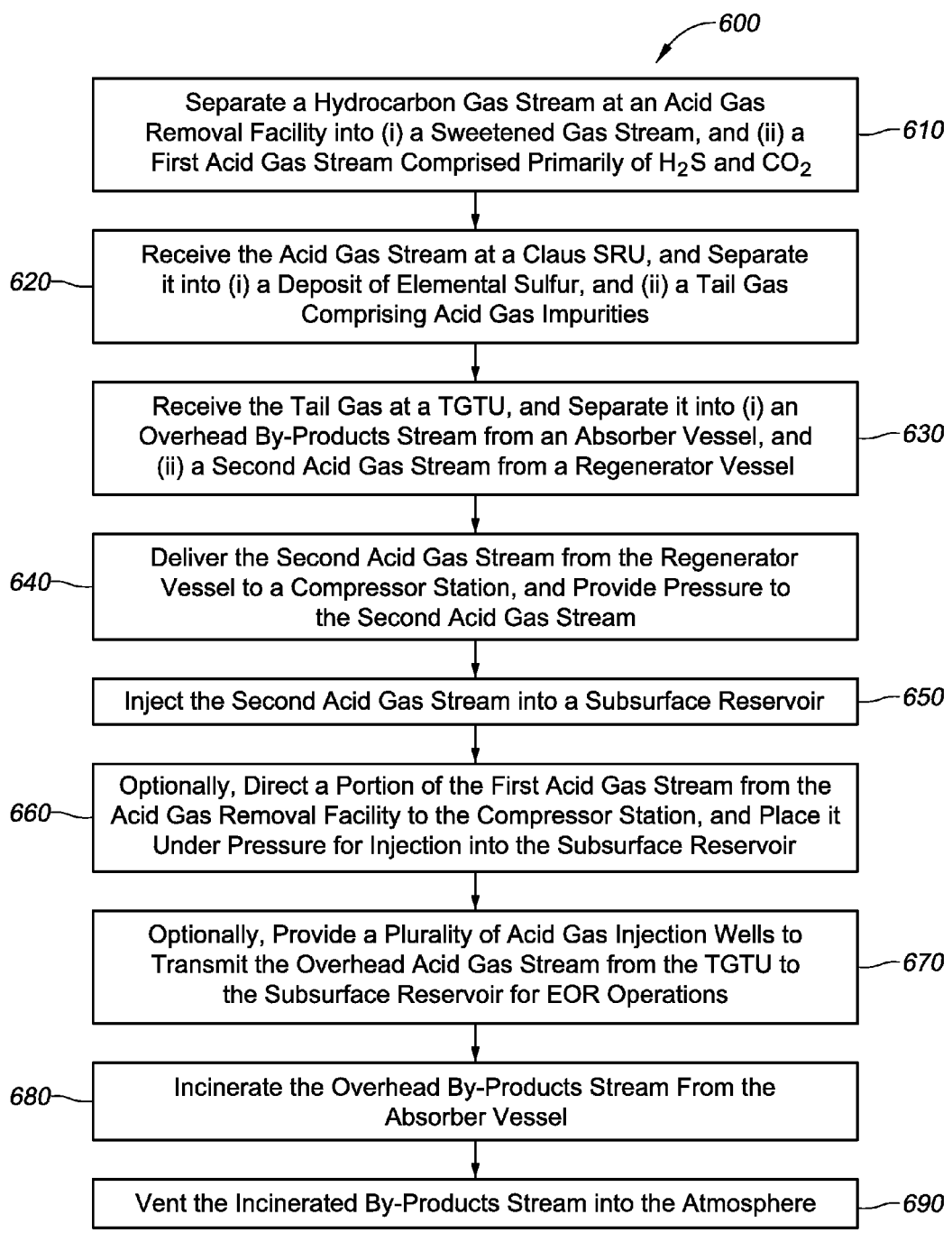
FIG. 6 provides a flow chart demonstrating steps for carrying out a method for processing a hydrocarbon gas stream, in one embodiment. The hydrocarbon gas stream comprises sulfurous components and carbon dioxide, and the method is carried out at a gas processing facility such as the facilities of FIG. 4 or FIG. 5B.

FIG. 6 provides a flow chart demonstrating steps for carrying out the method 600 for processing a hydrocarbon gas stream, in one embodiment. The hydrocarbon gas stream comprises sulfurous components and carbon dioxide. The method 600 is carried out at a gas processing facility.

The method 600 first includes separating the hydrocarbon gas stream at an acid gas removal facility. This is shown at Box 610. The hydrocarbon gas stream is separated into (i) a sweetened gas stream, and (ii) a first acid gas stream comprised primarily of hydrogen sulfide and carbon dioxide.

The method 600 also includes receiving the acid gas stream at a Claus sulfur recovery unit. This is shown at Box 620. The acid gas stream is separated into (i) a liquid stream of elemental sulfur, and (ii) a tail gas comprising acid gas impurities.

The method 600 further includes receiving the tail gas at a tail gas treating unit. This is shown at Box 630. The tail gas is separated into (i) an overhead by-products stream from an absorber vessel, and (ii) a second acid gas stream from a regenerator vessel. Preferably, the absorber vessel utilizes an amine that absorbs both carbon dioxide and sulfurous components such that a majority of the $CO_2$ and $H_2S$ entering the tail gas treating unit is absorbed in the absorber vessel and released from the absorber vessel to the regenerator vessel as a rich solvent stream. Both the carbon dioxide and the sulfurous components are later released from the regenerator vessel as the tail gas treating unit regenerated overhead gas stream.

The method 600 next includes delivering the second acid gas stream from the regenerator vessel to a compressor station. This is shown in Box 640. At the compressor station, pressure is provided to the second acid gas stream. The method 600 then provides for injecting the second acid gas stream into a subsurface reservoir. This is presented in Box 650.

In one aspect, a portion of the first acid gas stream from the acid gas removal facility is taken to the compressor station and placed under pressure for injection into the subsurface reservoir. This is provided in Box 660. The portion of the acid gas stream is injected along with the second acid gas stream from the regenerator vessel.

The method 600 also comprises providing one and optionally a plurality of acid gas injection wells. This is seen at Box 670. The plurality of acid gas injection wells transmit the overhead acid gas stream from the tail gas treating unit to the subsurface reservoir for sequestration or for enhanced oil recovery operations.

In one embodiment, the method 600 also includes warming the rich solvent stream in a heat exchanger before it enters the regenerator vessel, and optionally directing the warmed rich solvent stream into a flash vessel before the rich solvent stream enters the regenerator vessel. The flash vessel releases at least some hydrocarbons as well as hydrogen sulfide and carbon dioxide as an overhead sour gas stream. Depending on conditions of the flash vessel and the type of amine, it may be possible to partially enrich the flashed overhead gas relative to $H_2S$ or $CO_2$. This enriched gas may then be segregated from the regenerator overhead gas, and directed to a separate reservoir, for example.

In another embodiment, the method 600 further comprises separating residual amine and condensed water from carbon dioxide and sulfurous components in the sour gas stream in a condenser vessel. The residual amine and condensed water are directed back to the regenerator vessel. In this embodiment, the sour gas stream from the regenerator vessel is taken through the condenser vessel before it is delivered to the compressor station for pressurization and sequestration.

Preferably, the method 600 further comprises incinerating the overhead by-products stream from the absorber vessel. This is shown in Box 680. The method then includes venting the incinerated by-products stream into the atmosphere. This is seen at Box 690.

In one arrangement, the gas processing facility further comprises an acid gas enrichment facility for receiving the first acid gas stream from the acid gas removal facility, and separating the acid gas stream into (i) an overhead $CO_2$-rich stream, and (ii) an $H_2S$-rich acid gas stream. In this arrangement, the method comprises:

receiving the $H_2S$-rich acid gas stream as the acid gas stream at the Claus sulfur recovery unit;

delivering the overhead $CO_2$-rich stream to the compressor station;

providing pressure to the overhead $CO_2$-rich stream at the compressor station; and injecting the overhead $CO_2$-rich stream into the subsurface reservoir along with the sour gas stream from the regenerator vessel.

While it will be apparent that the inventions herein described are well calculated to achieve the benefits and advantages set forth above, it will be appreciated that the inventions are susceptible to modification, variation and change without departing from the spirit thereof. For example, the various inventions have been described herein in connection with the processing of a gas stream incident to hydrocarbon recovery operations. However, the gas processing facilities and methods may be applied to the recovery and sequestration of carbon dioxide and hydrogen sulfide in other applications.

For example, the gas processing facilities and methods may be applied to the recovery and sequestration of carbon dioxide and sulfur dioxide from a flue gas stream from a power plant. Alternatively, the gas stream may be a flash gas stream taken from a flash drum in a gas processing facility itself. Alternatively, the gas stream may be a synthesis gas stream (so-called "syn-gas"). It is noted that where syn-gas is used, the gas will need to be cooled and undergo solids filtration before introduction into the facility 400 or 500B. Alternatively still, the gas stream may be a $CO_2$ emission from a cement plant or other industrial plant. In this instance, $CO_2$ may be absorbed from excess air or from a nitrogen-containing flue gas.

Provided are further embodiments A-Z:

Embodiment A: A gas processing facility for processing a hydrocarbon gas stream comprising sulfurous components and carbon dioxide, the gas processing facility comprising:
an acid gas removal facility for separating the hydrocarbon gas stream into (i) a sweetened gas stream, and (ii) a first acid gas stream comprised primarily of hydrogen sulfide and carbon dioxide;
a Claus sulfur recovery unit for receiving the acid gas stream, and separating the first acid gas stream into (i) a liquid stream of elemental sulfur, and (ii) a tail gas comprising acid gas impurities;
a tail gas treating unit for receiving the tail gas, and separating the tail gas into (i) an overhead by-products stream from an absorber vessel, and (ii) a second acid gas stream from a regenerator vessel, the second acid gas stream containing a substantial portion of the hydrogen sulfide and the carbon dioxide in the tail gas; and a compressor station for receiving the second acid gas stream from the regenerator vessel, and providing pressure to the second acid gas stream for injection into a subsurface reservoir.

Embodiment B: The gas processing facility of embodiment A, wherein the tail gas treating unit reduces the oxidized sulfur species to $H_2S$.

Embodiment C: The gas processing facility of embodiment A or B, wherein the absorber vessel utilizes an amine that absorbs both carbon dioxide and sulfurous components such that a majority of the carbon dioxide entering the tail gas treating unit is absorbed in the absorber vessel and released from the absorber vessel to the regenerator vessel as a rich solvent stream.

Embodiment D: The gas processing facility of any of embodiments C, wherein the amine comprises diethanol amine (DEA), di-isopropanol amine (DIPA), monoethanol (MEA), or combinations thereof.

Embodiment E: The gas processing facility of any of embodiments D, wherein: the amine comprises methyl diethanol amine (MDEA); and the MDEA is activated to facilitate $CO_2$ absorption.

Embodiment F: The gas processing facility of embodiment E, wherein the MDEA is activated with piperazine.

Embodiment G: The gas processing facility of any of embodiments A-F, further comprising:
a plurality of acid gas injection wells for transmitting the second acid gas stream from the compressor station to the subsurface reservoir.

Embodiment H: The gas processing facility of any of embodiments A-G, wherein the overhead gas stream is used for enhanced oil recovery operations in the subsurface reservoir.

Embodiment I: The gas processing facility of any of embodiments A-H, further comprising:
a heat exchanger for warming the rich solvent stream before it enters the regenerator vessel.

Embodiment J: The gas processing facility of any of embodiments A-I, wherein a portion of the first acid gas stream from the acid gas removal facility is taken to the compressor station and placed under pressure for injection into the subsurface reservoir along with the second acid gas stream from the regenerator vessel.

Embodiment K: The gas processing facility of any of embodiments C-J, further comprising:
a condenser vessel for separating residual amine and condensed water from carbon dioxide and sulfurous components in the second acid gas stream; and
a line for directing the residual amine and condensed water back to the regenerator vessel;
and wherein the second acid gas stream from the regenerator vessel is taken through the condenser vessel for removal of residual amine before it is delivered to the compressor station.

Embodiment L: The gas processing facility of any of embodiments C-K, further comprising:
an acid gas enrichment facility for receiving the first acid gas stream from the acid gas removal facility, and separating the acid gas stream into (i) an overhead $CO_2$-rich stream, and (ii) an $H_2S$-rich acid gas stream; and
wherein:
the first acid gas stream received by the Claus sulfur recovery unit is the $H_2S$-rich acid gas stream, and
the overhead $CO_2$-rich stream is directed from the acid gas enrichment facility to the compressor station and placed under pressure for injection into the subsurface reservoir along with the second acid gas stream from the regenerator vessel of the tail gas treating unit.

Embodiment M: The gas processing facility of embodiment L, further comprising:
a single-stage, co-current contactor placed between the quench tower and the absorber vessel of the tail gas treating unit for (i) at least partially removing $H_2S$ from the tail gas before it is delivered to the absorber vessel, and (ii) releasing a $CO_2$-rich stream to the absorber vessel in the tail gas treating unit.

Embodiment N: The gas processing facility of any of embodiments A-M, further comprising:
an incinerator for receiving the overhead by-products stream from the absorber vessel for incineration.

Embodiment O: The gas processing facility of claim embodiment N, wherein the incinerator either incinerates through a fuel gas combustion process, or through a catalytic incineration process.

Embodiment P: The gas processing facility of any of embodiments A-O, wherein the hydrocarbon gas stream comprises raw natural gas from a hydrocarbon production operation, a flue gas stream from an industrial power plant, or a $CO_2$ emission from a cement plant.

Embodiment Q: A method for processing a hydrocarbon gas stream in a gas processing facility, the hydrocarbon gas stream comprising sulfurous components and carbon dioxide, the method comprising:

separating the hydrocarbon gas stream at an acid gas removal facility into (i) a sweetened gas stream, and (ii) a first acid gas stream comprised primarily of hydrogen sulfide and carbon dioxide;

receiving the acid gas stream at a Claus sulfur recovery unit and separating the acid gas stream into (i) a liquid stream of elemental sulfur, and (ii) a tail gas comprising acid gas impurities;

receiving the tail gas at a tail gas treating unit, and separating the tail gas into (i) an overhead by-products stream from an absorber vessel, and (ii) a second acid gas stream from a regenerator vessel, the second acid gas stream containing a substantial portion of the carbon dioxide in the tail gas;

delivering the second acid gas stream from the regenerator vessel to a compressor station;

providing pressure to the second acid gas stream from the regenerator vessel at a compressor station; and injecting the second acid gas stream into a subsurface reservoir.

Embodiment R: The method of embodiment Q, wherein the absorber vessel utilizes an amine that absorbs both carbon dioxide and sulfurous components such that a majority of the carbon dioxide entering the tail gas treating unit is absorbed in the absorber vessel and released from the absorber vessel to the regenerator vessel along with sulfurous components as a rich solvent stream.

Embodiment S: The method of embodiment R, wherein the amine comprises diethanol amine (DEA), di-isopropanol amine (DIPA), monoethanol (MEA), or combinations thereof.

Embodiment T: The method of embodiment S, wherein:
the amine comprises methyl diethanol amine (MDEA); and
the MDEA is activated to facilitate $CO_2$ absorption.

Embodiment U: The method of embodiment T, wherein the MDEA is activated with piperazine.

Embodiment V: The method of any of embodiments Q-U, further comprising:
providing a plurality of acid gas injection wells for transmitting the second acid gas stream from the regenerator vessel in the tail gas treating unit to the subsurface reservoir for enhanced oil recovery operations.

Embodiment W: The method of any of embodiments Q-V, wherein a portion of the first acid gas stream from the acid gas removal facility is taken to the compressor station and placed under pressure for injection into the subsurface reservoir along with the second acid gas stream from the regenerator vessel of the tail gas treating unit.

Embodiment X: The method of any of embodiments R-W, further comprising:
separating residual amine and condensed water from carbon dioxide and sulfurous components in the second acid gas stream in a condenser vessel; and
directing the residual amine and condensed water back to the regenerator vessel;
wherein the second acid gas stream from the regenerator vessel is taken through the condenser vessel for removal of residual amine before it is delivered to the compressor station.

Embodiment Y: The method of any of embodiments Q-X, wherein:
the gas processing facility further comprises an acid gas enrichment facility for receiving the first acid gas stream from the acid gas removal facility, and separating the acid gas stream into (i) an overhead $CO_2$-rich stream, and (ii) an $H_2S$-rich acid gas stream; and the method further comprises:
receiving the $H_2S$-rich acid gas stream as the acid gas stream at the Claus sulfur recovery unit;
delivering the overhead $CO_2$-rich stream to the compressor station;
providing pressure to the overhead $CO_2$-rich stream at the compressor station;
and
injecting the overhead $CO_2$-rich stream into the subsurface reservoir along with the second acid gas stream from the regenerator vessel of the tail gas treating unit.

Embodiment Z: The method of any of embodiments Q-Y, further comprising:
incinerating the overhead by-products stream from the absorber vessel; and venting the incinerated by-products stream into the atmosphere.

What is claimed is:

1. A gas processing facility for processing a hydrocarbon gas stream comprising sulfurous components and carbon dioxide, the gas processing facility comprising:
an acid gas removal facility for separating the hydrocarbon gas stream into (i) a sweetened gas stream, and (ii) a first acid gas stream comprised primarily of hydrogen sulfide and carbon dioxide;
a sulfur recovery unit for receiving the first acid gas stream, and separating the first acid gas stream into (i) a liquid stream of elemental sulfur, and (ii) a tail gas comprising acid gas impurities;
a tail gas treating unit having a reducing gas generator and a catalytic bed to hydrogenate the tail gas, an absorber vessel, and a solvent regenerator vessel, where the tail gas treating unit receives the tail gas and separates the tail gas into (i) an overhead by-products stream from the absorber vessel, and (ii) a second acid gas stream from the regenerator vessel, where the second acid gas stream is a carbon dioxide-rich gas stream; and
a compressor station for receiving the second acid gas stream from the regenerator vessel, and providing pressure to the second acid gas stream for injection into a subsurface reservoir.

2. The gas processing facility of claim 1, wherein the tail gas treating unit is also for reducing the oxidized sulfur species to $H_2S$.

3. The gas processing facility of claim 1, wherein the hydrocarbon gas stream comprises raw natural gas from a hydrocarbon production operation, a flue gas stream from an industrial power plant, or a $CO_2$ emission from a cement plant.

4. The gas processing facility of claim 1, further comprising:
a plurality of acid gas injection wells for transmitting the second acid gas stream from the compressor station to the subsurface reservoir.

5. The gas processing facility of claim 4, wherein the overhead gas stream is used for enhanced oil recovery operations in the subsurface reservoir.

6. The gas processing facility of claim 1, wherein the absorber vessel utilizes an amine that absorbs both carbon dioxide and sulfurous components such that a majority of the carbon dioxide entering the tail gas treating unit is absorbed in the absorber vessel and released from the absorber vessel to the regenerator vessel as a rich solvent stream.

7. The gas processing facility of claim 6, wherein the amine comprises diethanol amine (DEA), di-isopropanol amine (DIPA), monoethanol (MEA), or combinations thereof.

8. The gas processing facility of claim 6, wherein:
the amine comprises methyl diethanol amine (MDEA); and
the MDEA is activated to facilitate $CO_2$ absorption.

9. The gas processing facility of claim 8, wherein the MDEA is activated with piperazine.

10. The gas processing facility of claim 6, further comprising:
a heat exchanger for warming the rich solvent stream before it enters the regenerator vessel.

11. The gas processing facility of claim 6, wherein a portion of the first acid gas stream from the acid gas removal facility is taken to the compressor station and placed under pressure for injection into the subsurface reservoir along with the second acid gas stream from the regenerator vessel.

12. The gas processing facility of claim 6, further comprising:
a condenser vessel for separating residual amine and condensed water from carbon dioxide and sulfurous components in the second acid gas stream; and
a line for directing the residual amine and condensed water back to the regenerator vessel;
and wherein the second acid gas stream from the regenerator vessel is taken through the condenser vessel for removal of residual amine before it is delivered to the compressor station.

13. The gas processing facility of claim 6, further comprising:
an acid gas enrichment facility for receiving the first acid gas stream from the acid gas removal facility, and separating the acid gas stream into (i) an overhead $CO_2$-rich stream, and (ii) an $H_2S$-rich acid gas stream; and
wherein:
the first acid gas stream received by the sulfur recovery unit is the $H_2S$-rich acid gas stream, and
the overhead $CO_2$-rich stream is directed from the acid gas enrichment facility to the compressor station and placed under pressure for injection into the subsurface reservoir along with the second acid gas stream from the regenerator vessel of the tail gas treating unit.

14. The gas processing facility of claim 13, further comprising:
a single-stage, co-current contactor placed between the quench tower and the absorber vessel of the tail gas treating unit for (i) at least partially removing $H_2S$ from the tail gas before it is delivered to the absorber vessel, and (ii) releasing a $CO_2$-rich stream to the absorber vessel in the tail gas treating unit.

15. The gas processing facility of claim 6, further comprising:
an incinerator for receiving the overhead by-products stream from the absorber vessel for incineration.

16. The gas processing facility of claim 15, wherein the incinerator either incinerates through a fuel gas combustion process, or through a catalytic incineration process.

17. A method for processing a hydrocarbon gas stream in a gas processing facility, the hydrocarbon gas stream comprising sulfurous components and carbon dioxide, the method comprising:
separating the hydrocarbon gas stream at an acid gas removal facility into (i) a sweetened gas stream, and (ii) a first acid gas stream comprised primarily of hydrogen sulfide and carbon dioxide;
receiving the first acid gas stream at a sulfur recovery unit and separating the first acid gas stream into (i) a liquid stream of elemental sulfur, and (ii) a tail gas comprising acid gas impurities;
receiving the tail gas at a tail gas treating unit having a reducing gas generator and a catalytic bed to hydrogenate the tail gas, an absorber vessel, and a solvent regenerator vessel, and separating the tail gas into (i) an overhead by-products stream from the absorber vessel, and (ii) a second acid gas stream from the regenerator vessel, where the second acid gas stream is a carbon dioxide-rich gas stream;
delivering the second acid gas stream from the regenerator vessel to a compressor station;
providing pressure to the second acid gas stream from the regenerator vessel at a compressor station; and
injecting the second acid gas stream into a subsurface reservoir.

18. The method of claim 17, further comprising:
providing a plurality of acid gas injection wells for transmitting the second acid gas stream from the regenerator vessel in the tail gas treating unit to the subsurface reservoir for enhanced oil recovery operations.

19. The method of claim 17, wherein a portion of the first acid gas stream from the acid gas removal facility is taken to the compressor station and placed under pressure for injection into the subsurface reservoir along with the second acid gas stream from the regenerator vessel of the tail gas treating unit.

20. The method of claim 17, wherein the absorber vessel utilizes an amine that absorbs both carbon dioxide and sulfurous components such that a majority of the carbon dioxide entering the tail gas treating unit is absorbed in the absorber vessel and released from the absorber vessel to the regenerator vessel along with sulfurous components as a rich solvent stream.

21. The method of claim 17, wherein:
the gas processing facility further comprises an acid gas enrichment facility for receiving the first acid gas stream from the acid gas removal facility, and separating the acid gas stream into (i) an overhead $CO_2$-rich stream, and (ii) an $H_2S$-rich acid gas stream; and
the method further comprises:
receiving the $H_2S$-rich acid gas stream as the acid gas stream at the sulfur recovery unit;
delivering the overhead $CO_2$-rich stream to the compressor station;
providing pressure to the overhead $CO_2$-rich stream at the compressor station; and
injecting the overhead $CO_2$-rich stream into the subsurface reservoir along with the second acid gas stream from the regenerator vessel of the tail gas treating unit.

22. The method of claim 17, further comprising:
incinerating the overhead by-products stream from the absorber vessel; and
venting the incinerated by-products stream into the atmosphere.

23. The method of claim 20, further comprising:
separating residual amine and condensed water from carbon dioxide and sulfurous components in the second acid gas stream in a condenser vessel; and
directing the residual amine and condensed water back to the regenerator vessel;
wherein the second acid gas stream from the regenerator vessel is taken through the condenser vessel for removal of residual amine before it is delivered to the compressor station.

24. The method of claim 20, wherein the amine comprises diethanol amine (DEA), di-isopropanol amine (DIPA), monoethanol (MEA), or combinations thereof.

25. The method of claim 20, wherein:
the amine comprises methyl diethanol amine (MDEA); and
the MDEA is activated to facilitate $CO_2$ absorption.

26. The method of claim 25, wherein the MDEA is activated with piperazine.

* * * * *